United States Patent [19]

Ichinomiya et al.

[11] Patent Number: 5,664,096
[45] Date of Patent: Sep. 2, 1997

[54] DISK ARRAY CONTROLLER CAPABLE OF PREVENTING DATA DISTORTION CAUSED BY AN INTERRUPTION OF DATA WRITE OPERATION

[75] Inventors: Hiroshi Ichinomiya, Kawasaki; Takao Satoh; Akira Yamamoto, both of Sagamihara, all of Japan

[73] Assignees: Hitachi, Ltd.; Hitachi Microcomputer System Ltd., both of Tokyo, Japan

[21] Appl. No.: 442,480

[22] Filed: May 16, 1995

Related U.S. Application Data

[62] Division of Ser. No. 5,994, Jan. 19, 1993.

[30] Foreign Application Priority Data

Jan. 21, 1992 [JP] Japan ............... 4-008211

[51] Int. Cl.⁶ ............. G06F 11/00; G06F 11/30
[52] U.S. Cl. ............. 395/185.01; 395/185.1; 364/238.4
[58] Field of Search ............. 395/181, 182.05, 395/182.06, 182.08, 182.12, 182.16, 182.19, 185.01, 185.1, 184.01, 185.08, 185.07; 364/236.2, 238.4

[56] References Cited

U.S. PATENT DOCUMENTS

| | | | |
|---|---|---|---|
| 4,881,169 | 11/1989 | Taneka et al. | 364/200 |
| 4,989,206 | 1/1991 | Dunphy, Jr. et al. | 371/10.1 |
| 5,014,237 | 5/1991 | Masters et al. | 364/200 |
| 5,025,432 | 6/1991 | Naito | 369/36 |
| 5,315,602 | 5/1994 | Noya et al. | 371/40.4 |
| 5,345,347 | 9/1994 | Hopkins et al. | 360/71 |
| 5,359,713 | 10/1994 | Moran et al. | 395/200 |
| 5,379,417 | 1/1995 | Lui et al. | 395/575 |
| 5,404,487 | 4/1995 | Murata et al. | 395/425 |
| 5,414,861 | 5/1995 | Horning | 395/750 |

*Primary Examiner*—Hoa T. Nguyen
*Attorney, Agent, or Firm*—Fay, Sharpe, Beall, Fagan, Minnich & McKee

[57] ABSTRACT

A disk array controller is connected to both a host computer and a plurality of disk drives operating in parallel. The disk array controller is responsive to an output request from the host computer for dividing data supplied from the host computer and parallel writing the divided data in the plurality of disk drives. In response to an input request from the host computer, the disk array controller combines data parallelly read from the disk drives into a set of data. Responsive to the output request, a processor stores in a non-volatile memory a write status of each block within a data write area for each disk drive to which data is to be written. The write status includes a first status representing a write completed status of each disk drive, a second status representing a writing status of each disk drive, and a third status representing a no write indication status of each disk drive.

11 Claims, 23 Drawing Sheets

DISK ARRAY CONTROLLER CAPABLE OF PREVENTING DATA DISTORTION CAUSED BY AN INTERRUPTION OF DATA WRITE OPERATION

This is a divisional of co-pending application Ser. No. 08/005,994 filed on Jan. 19, 1993.

CROSS-REFERENCES TO RELATED APPLICATIONS

The present application relates to copending applications U.S. patent application Ser. No. 07/827,982 filed on Jan. 29, 1992 entitled "Storage Unit Subsystem" by Akira YAMAMOTO, et al. assigned to Hitachi Ltd., and U.S. patent application Ser. No. 07/833,129 filed on Feb. 10, 1992 entitled "Controller for Storage Unit and Method of Controlling Storage Unit" by Toshiaki TSUBOI, et al. assigned to Hitachi Ltd. and Hitachi Microcomputer System Ltd.

BACKGROUND OF THE INVENTION

The present invention relates to a memory system for computers, and more particularly to a disk array controller for controlling a plurality of disk drives arranged in an array for the parallel and simultaneous operations of the disk drives.

As an example of related arts of a disk array controller, there is known JP-A-2-236714 corresponding to U.S. Pat. No. 5,148,432. According to this related art, the disk array controller is connected to disk drives via small computer system interfaces (SCSI). In writing data with redundancy into a disk, the disk array controller divides data to be written into each of the sector. While each of data is sequentially being transferred via SCSI to different disk drives, redundant data is generated by using an error correcting code (ECC) engine.

With this related art, since data write is executed without synchronization between disk drives, there is a possibility of different timings between disk drives when data transferred from SCSI is actually written in the disk drives. Accordingly, if the operation of writing data into a plurality of disk drives in response to the same write request is interrupted by a power failure or the like, there occurs a phenomenon that data write has completed for some disk drives, but not for other disk drives. Therefore, if a host computer reads data from the region where some disk drives have been written with data and other disk drives have not been written with data and still has past data, the read data contains both the write completed data and past data, resulting in transferring inconsistent data to the host computer. Data not actually written that is read by the host computer is called data distortion. This phenomenon should be avoided by all means, with respect to auxiliary storage units of a computer system.

SUMMARY OF THE INVENTION

It is an object of the present invention to provide a disk array controller capable of preventing from data distortion to be otherwise caused by an interruption of data write to a disk array.

According to one of the apparatus of the present invention for preventing from data distortion of a disk array to be caused by a power cut or the like, a non-volatile memory is provided within a disk array controller, and upon a data write request, information of the divisional data write range of each disk drive is stored in the non-volatile memory. If the data write to the disk drives is interrupted by a failure, information of the write interrupted range is stored in the non-volatile memory. Upon a data read request from the host computer after recovering the failure, the non-volatile memory is referenced to check whether the read request range contains the data write interrupted range. If the read range contains the data write interrupted range and if it is judged that both the written data and past data are contained in the read range leaving a possibility of inconsistent data, a read error is informed to the host computer. In this manner, inconsistent data transfer to the host computer is suppressed and data distortion is prevented.

According to another apparatus for preventing from data distortion of the present invention, upon a data write request to disk drives, the disk array controller adds data called an update number formed for each data write request, to the data to be written to each physical block of disk drives storing the divisional data. When reading the data, it is checked whether the update numbers read from the disk drives are identical. It is therefore possible to judge whether the divisional data read from the disk drives is the data written upon the same data write request. If the update numbers of divisional data are different, it is judged that the read data is inconsistent. In such a case, a read error is informed to the host computer, thereby preventing from distorted data being transferred to the host computer.

There is also provided an apparatus constructed of a combination of the above-described two apparatuses, for checking whether the update numbers are different, only for the case where it is impossible to ensure the consistency of data contents by using the information stored in the non-volatile memory.

In the case of a disk array with redundancy, data can be recovered by using the redundancy even if the data was written defectively. By applying the apparatus of the present invention to such a redundancy system, complete data can be recovered, thereby preventing data distortion.

According to the present invention, information of the data write completed range of disk drives is being stored in the non-volatile memory, even after the operation of the disk array is interrupted by a power failure or the like and the divisional data write to disk drives is interrupted. As a result, upon reception of a read request containing the write interrupted range from the host computer, the write interrupted range can be identified on the basis of the information stored in the non-volatile memory. It is therefore possible to eliminate a possibility of transferring inconsistent data having both data before and after the data write to the host computer.

The disk array controller for storing data having redundancy carries out the recovery of data stored in a disk array with redundancy at the write interrupted range, by using the information stored in the non-volatile memory. It is therefore possible to reduce the amount of data which might otherwise be lost by an interruption during writing divisional data to disk drives.

DESCRIPTION OF THE PREFERRED EMBODIMENTS

1) 1st Embodiment

Figure 1:
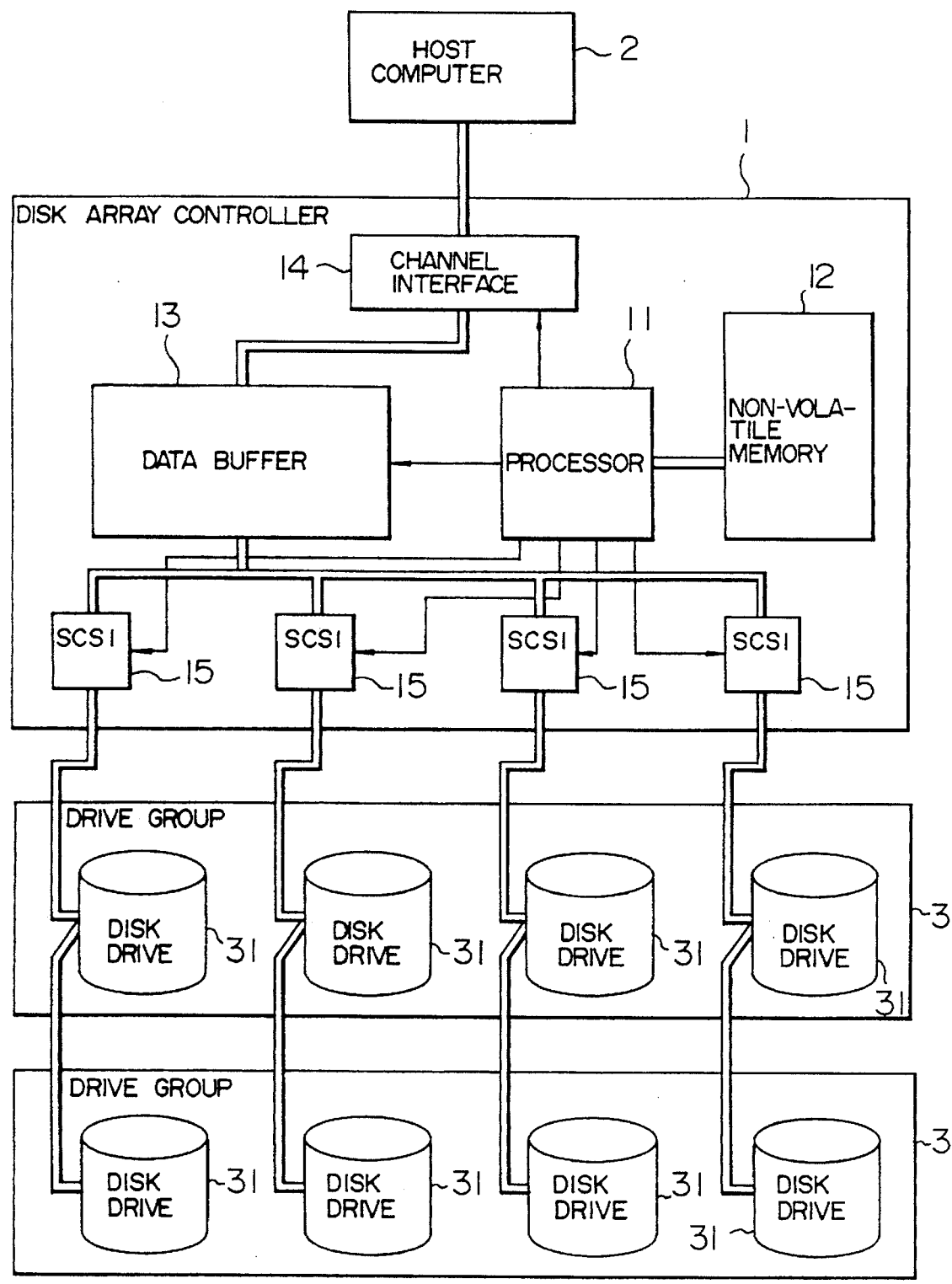
FIG. 1 shows the configuration of a computer system having a disk array controller according to a first embodiment of the present invention.

FIG. 1 shows the configuration of a computer system having a disk array controller 1 according to the first embodiment of the present invention. The disk array controller 1 has a data buffer 13 for temporarily storing data supplied from a host computer 2 or disk drives 31, a processor 11 for controlling the operation of the disk array controller 1, and a non-volatile memory 12 whose contents can be held even upon a power cut and to and from which the processor 11 can write and read data. The disk array controller 1 is connected to the host computer 2 via a channel interface 14, and to the plurality of disk drives 31 via SCSI (Small Computer System Interface) interfaces. Each SCSI interface 15 is connected to the plurality of disk drives 31. Data can be transferred in parallel to and from the disk drives 31 via different SCSI interfaces 15. Data from the host computer 2 is stored divisionally in the plurality of disk drives 31 constituting a drive group 3.

Figure 2:
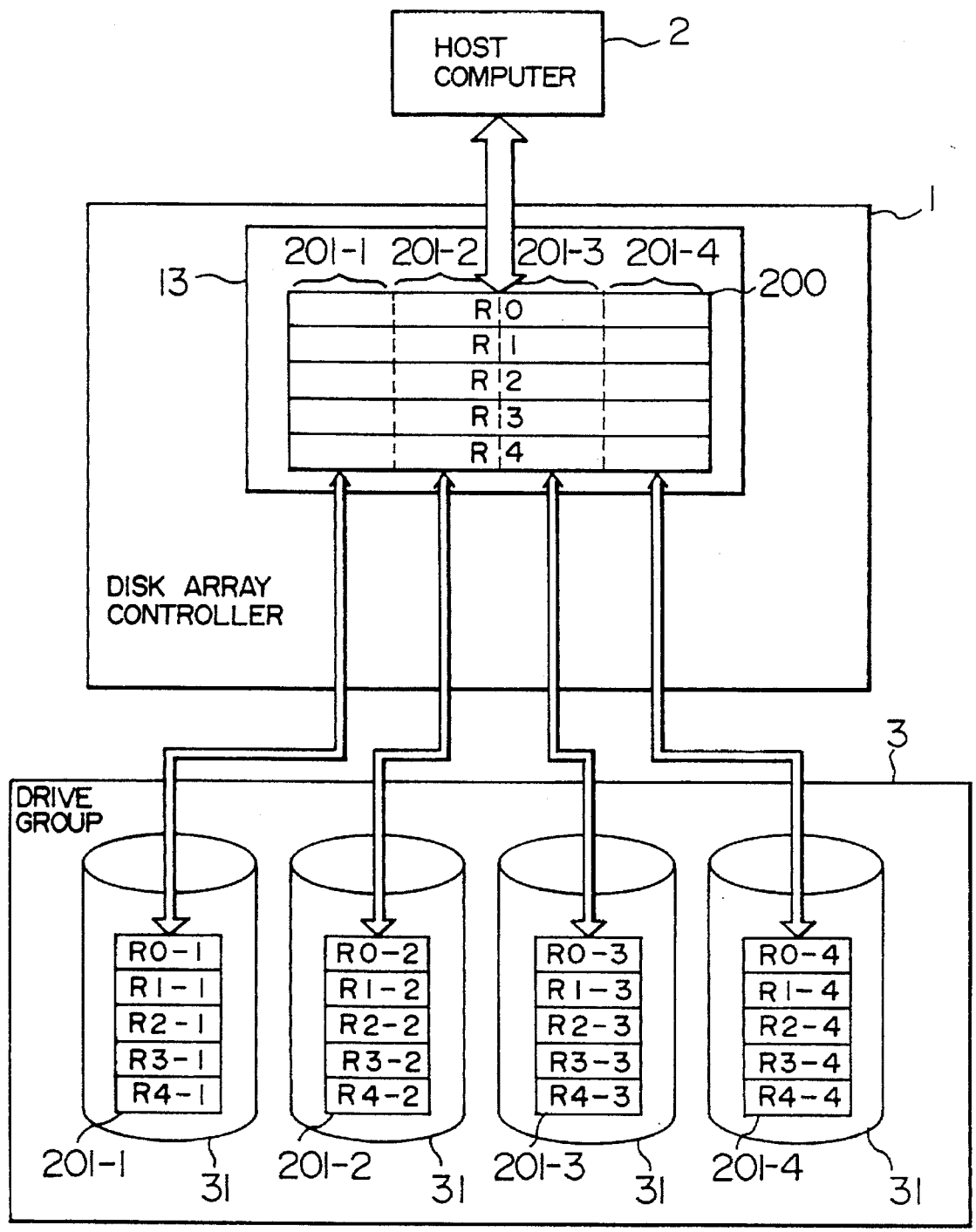
FIG. 2 illustrates the outline of data division and assembly to be executed by the disk array controller.

FIG. 2 illustrates how data from the host computer 2 is distributed to the plurality of disk drives 31 constituting drive group 3, and how the data is assembled in the disk drives 31. When an output request is issued by the host computer 2, data 200 supplied from the host computer 2 is divided into divisional data 201-1 to 201-4 in the disk array controller 1, the divisional data 201-1 to 201-4 being transferred in parallel to the plurality of disk drives 31 of the drive group 3 and stored therein. Data 200 is constituted by a plurality of blocks R0 to R4, each block being further divided. The divisional data 201-1 to 201-4 constitute each of the block data R0-1 to R4-1, R0-2 to R4-2, R0-3 to R4-3, and R0-4 to R4-4, respectively. When an input request is issued by the host computer 2, the divisional data 201-1 to 201-4 read from the disk drives 31 of the drive group 3 are assembled in the disk array controller 1 and transferred to the host computer 2.

Figure 3:
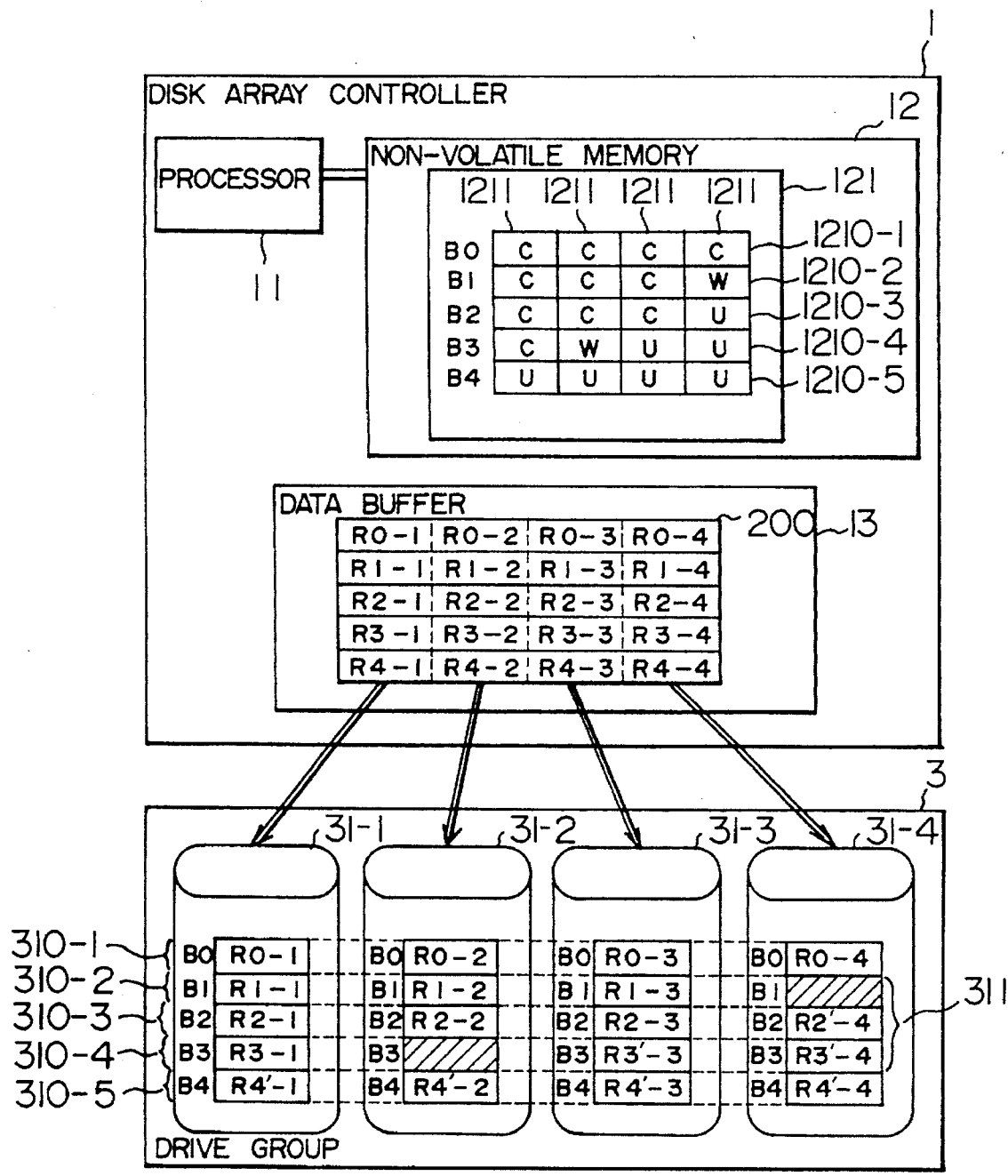
FIG. 3 illustrates the basis of management by a disk control table.

FIG. 3 shows an example of the write operation according to the first embodiment. When the disk array controller 1 receives an output request from the host computer 2, a write control table 121 is allocated to a non-volatile memory 12. The write control table 121 is a table for managing the write statuses for each drive group 3 constituted by disk drives 31-1 to 31-4. The write status represents to which block of the write range, data is to be written, and also represents in which block, data was written. In the example shown in FIG. 3, a bit map is used for storing the write statuses. Each of the entries 1210-1 to 1210-5 of the write control table 121 has write status flags 1211 for each of blocks 310-1 to 310-5 of the write range in the disk drives 31-1 to 31-4 constituting each drive group 3. For example, each write status flag 1211 is assigned with two bits. "00" represents a no write indication status (U), "01" represents a writing status (W), and "10" represents a write completed status (C). For the simplicity, the write status of each block is represented by "U", "W", or "C" in FIG. 3.

When the write control table 121 is allocated to the non-volatile memory 12, all the write status flags 1211 are initialized to the no write indication status (U). Prior to issuing a write command to each of the disk drive 31-1 to 31-4 from the processor 11, the processor 11 changes the write status flag 1211 corresponding to a block to be written by the write command to the writing status (W) for the block to be written with data. Upon receiving a write completion response from each of the disk drives 31-1 to 31-4, the processor 11 changes the write status flag 1211 to the write completed status (C) for the block which sent the write completion response.

Figure 4:
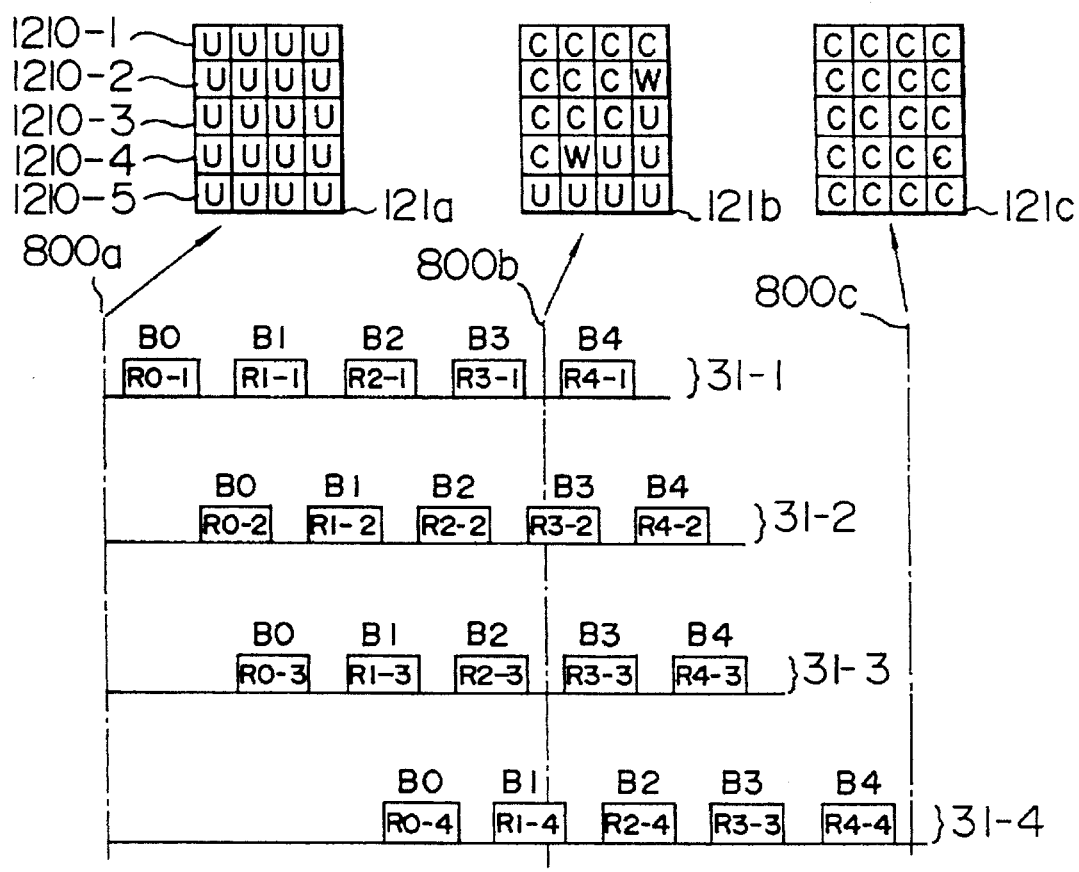
FIG. 4 shows the write timings of divisional data to disk drives and a change in the contents of the write control table.

An example of timings of writing divisional data to disk drives and a change in the contents of the write control table are shown in FIG. 4. The contents of write control tables 121a to 121c correspond to timings 800a to 800c. A write command is not still issued to none of the disk drives 31-1 to 31-4 at the timing 800a. Therefore, all the write status flags 1211 of the write control table 121a are given the no write indication status (U). At the timing 800b, data has been written completely in some blocks, and is being written in some blocks, and to some blocks the write command is still not issued. Therefore, the write completed status (C), writing status (W), and no write indication status (U) are mixed in the write status flags 1211. Because of the rotation deviation between disk drives and the retry operation of disk drives, the write timings may, differ from one disk drive to another disk drive such as shown in FIG. 4. Since data write to all the blocks within the write range has been completed, all the write status flags 1211 indicate the write completed status. After data write to all disk drives 31-1 to 31-4 of the driver group 3 has been completed at the timing 800c and if all the write status flags 1211 of the write control table 121 indicate the write completed status (C), then the write control table 121 is no more necessary. Therefore, the processor 11 delete the unnecessary write control table 121 from the non-volatile memory 12.

FIG. 3 shows the contents of the write control table, data buffer, and drive group, at the timing 800b shown in FIG. 4. For all the disk drives 31-1 to 31-4 constituting the drive group 3, the block 310-1 is in the write completed status (C) and the block 310-5 is in the no write indication status (U). However, in the blocks 310-2 to 310-4, some disk drives are in the writing status (W), or the block at the same address has both the no write indication status (U) and write completed status (C). The state that the block at the same address has the writing status (W), both the no write indication status (U) and write completed status (C), as in the case of the disk drives 31-1 to 31-4 constituting the drive group 3, is called a defective write state. A range in the defective write state is called a defective write range 311. In the example shown in FIG. 3, the blocks 310-2 to 310-4 correspond to the defective write range.

Even if a power cut occurs at the timing 800b shown in FIG. 4 under the state illustrated in FIG. 3, information of the blocks 310-2 to 310-4 representing the defective write range 311, remains stored in the write control table 121. Therefore, after the power is recovered, the defective write range 311 can be identified by referring to the write control table 121 stored in the non-volatile memory 12. There is a possibility that data before and after the data write both exist in the defective write range 311, being unable to ensure data consistency. For this reason, when an input request for the defective write range 311 is issued from the host computer 2, the disk array controller 1 informs a read error to the host computer 2.

Figure 5:
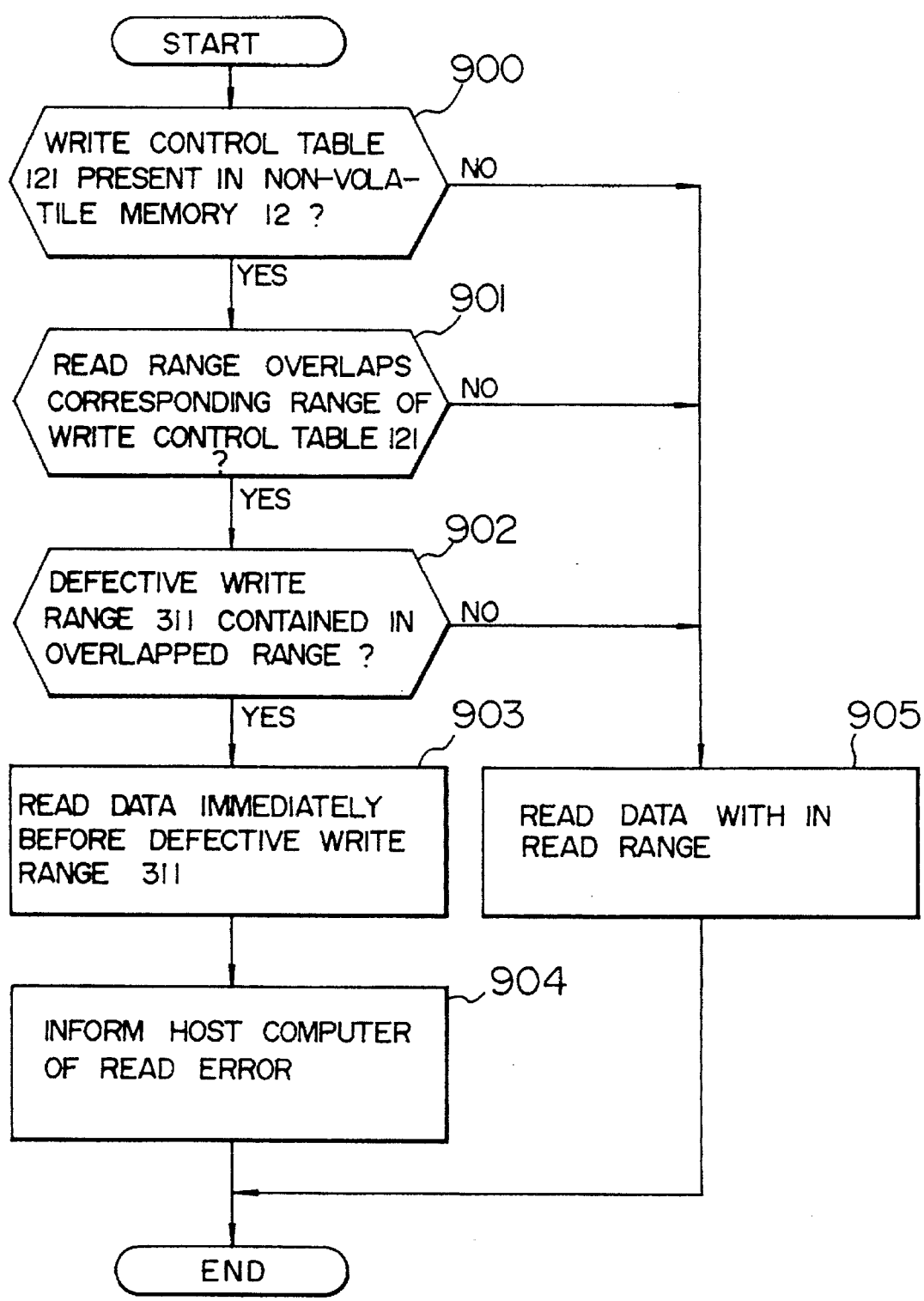
FIG. 5 is a flow chart showing the operation of judging a defective write range in the input request process.

FIG. 5 is a flow chart showing the operation of the processor 11 to be executed in response to an input request from the host computer 2. Upon reception of an input request from the host computer 2, the processor 11 checks whether there is a write control table 121 in the non-volatile memory 12 (step 900). If not, it means that there is no defective write range 311. In this case, an ordinary read process is executed at step 905. If there is a write control table 121 in the non-volatile memory 12, it is checked at step 901 whether the input request range overlaps the corresponding range within the write control table 121. If the corresponding range is not overlapped by the input request range, it means that the defective write range 311 is not present within the input request range, and therefore an ordinary read process is executed at the step 905. If the corresponding range within the write control table 121 overlaps the input request range, it is checked at step 902 whether the overlapped range contains the defective write range 311. If all the write status flags 1211 of the write control table 121 at each entry 1210 corresponding to the block to be checked, indicate the write completed status (C) or no write indication status (U), it means the overlapped range does not contain the defective write range 311, and if not, it means that the overlapped range contains the defective write range 311. An ordinary read operation is executed at the step 905 if the overlapped range does not contain the defective write range 311. On the other hand, if the overlapped range contains the defective write range 311, data immediately before the defective write range 311 is read at step 903, and thereafter a read error is informed to the host computer at step 904.

An output request to the defective write range 311 is not inhibited. If data write to the defective write range 311 is completed normally, the data written block is no more the defective write range 311. After data is written in the defective write range 311 in the output request process, the data written range is released from the defective write range 311.

Figure 6:
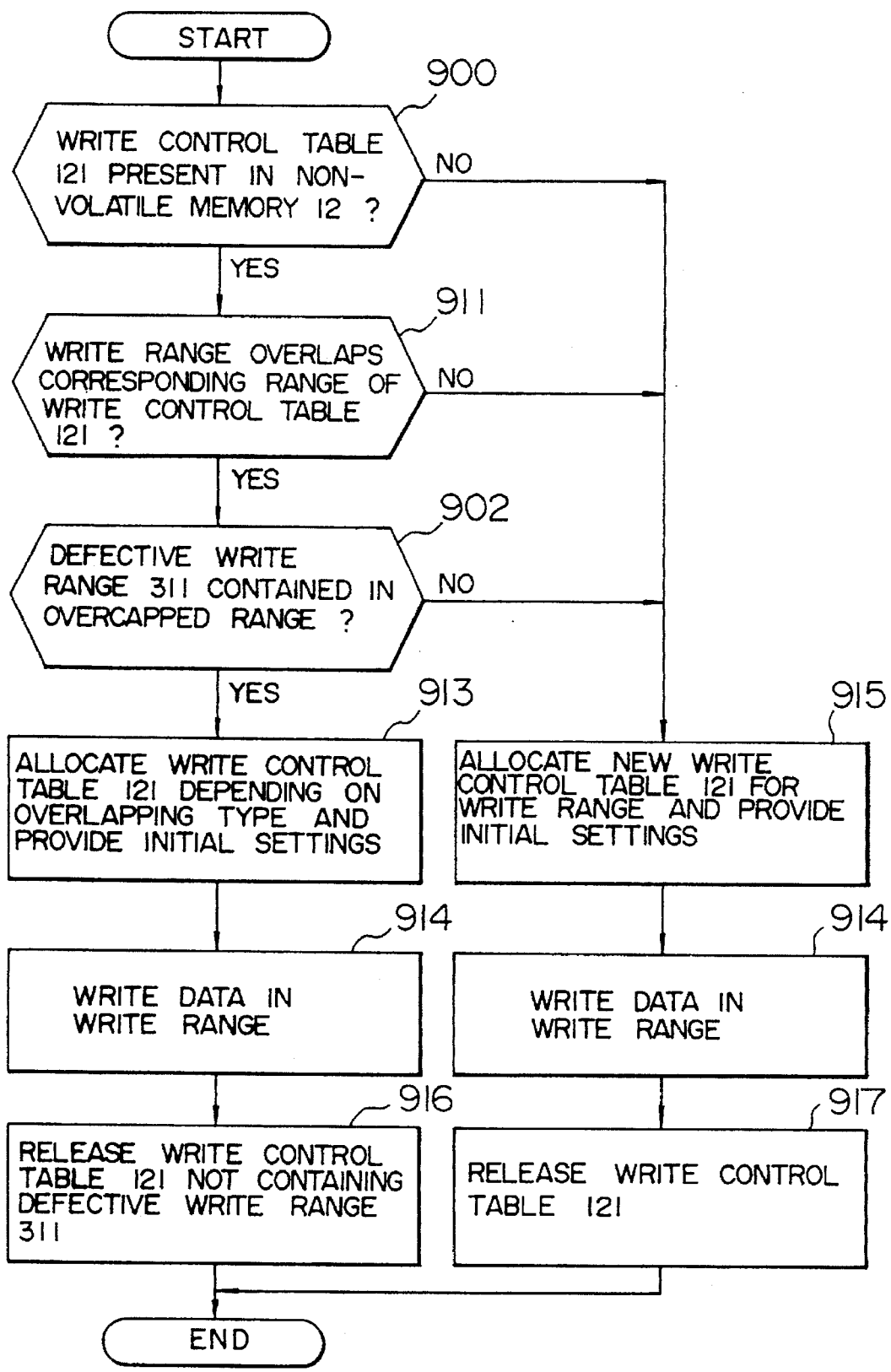
FIG. 6 is a flow chart showing the operation of judging a defective write range in the output request process.

FIG. 6 is a flow chart showing the operation of the processor 11 to be executed in response to an output request from the host computer 2. Upon reception of an output request from the host computer 2, the processor 11 checks whether there is a write control table 121 in the non-volatile memory 12 (step 900). If not, it means that there is no defective write range 311. In this case, at step 915 a new write control table 121 for the write range is allocated and all the write status flags 1211 are initialized to the no write indication status (U), to thereafter execute data write at step 914. As described previously with FIG. 3, at the data write process 914, immediately before issuing a write command to the disk drive 31, the corresponding write status flags 1211 of the write control table 121 are changed to the writing status (W), and thereafter they are changed to the write completed status (C) upon reception of a write completion response to the write command from the disk drive 31. After the normal data write completion, the write control table 121 which is now unnecessary, is released at step 917.

If it is judged at the step 900 that there is a write control table 121, it is checked at step 911 whether the output request range overlaps the corresponding range within the write control table 121. If the corresponding range is not overlapped by the input request range, the flow advances to the step 915. If the corresponding range within the write control table 121 overlaps the output request range, it is checked at step 902 whether the overlapped range contains the defective write range 311. If not, the flow advances to the step 915. If the corresponding range contains the defective write range 311, the flow advance to step 914 whereat a write control table is allocated if necessary and initialized to execute data write at step 914. At step 916, the write control table 121 not containing the defective write range 311 is released. After data is overwritten on the whole area of the defective write range 311, the write range is no more the defective write range 311 so that all the write control tables 121 are released.

On the other hand, if data is overwritten on the defective write range 311 partially, the area of the defective write range 311 not overwritten remains as the defective write range. Therefore, the write control table 121 managing such an area not overwritten is not released and remains stored.

Figure 7:
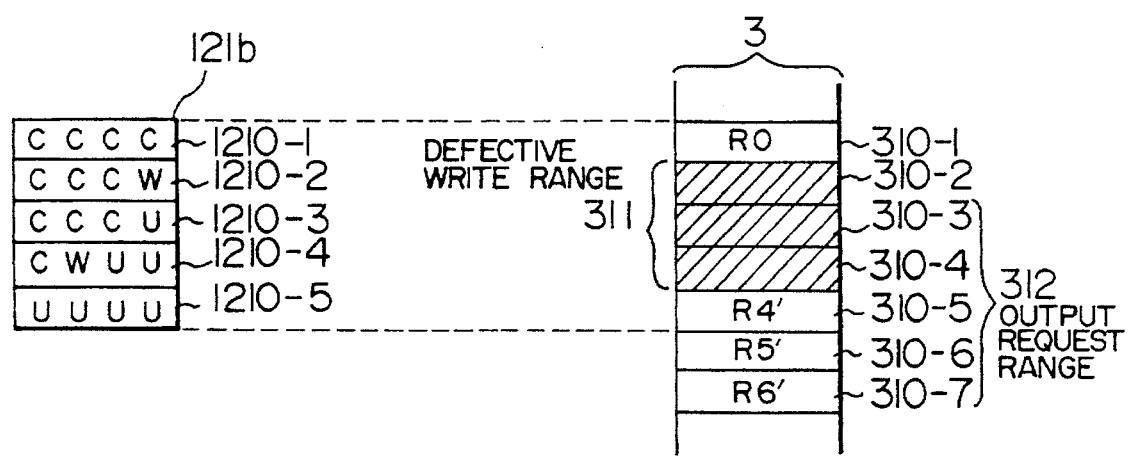
FIG. 7 shows the defective write range upon a write interruption and the contents of the write control table.

A change in the contents of the write control table 121 when data is written in an area containing the detective write range 311 will be described. FIG. 7 shows an example of the contents of the write control table having a defective write range caused by a data write interruption. In FIG. 7, blocks 310-2 to 310-4 are the defective write range 311, and the write control table 121b for blocks 310-1 to 310-5 is already present. It is assumed now that an output request for the blocks 310-3 to 310-7 was received. In the output request process shown in FIG. 6, it is judged at the step 902 that the output request range overlaps the defective write range 311. At the step 913, the write control table 121b is initialized as shown in a write control table 121d-1, and a new write control table 121d-2 is allocated to manage the write statuses of the blocks 310-6 and 310-7 and initialized as shown.

Figure 8:
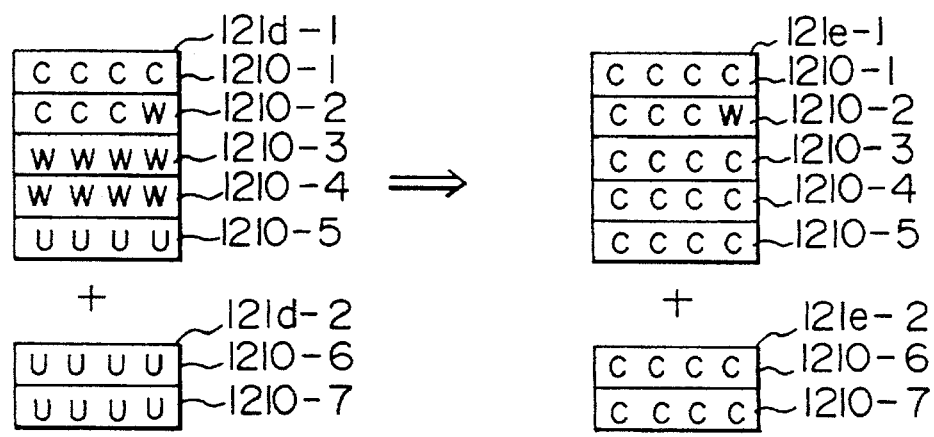
FIG. 8 shows a change in the contents of the write control table when writing data to the defective write range.

FIG. 8 shows a change in the contents of the write control table when data is written in the defective write range. In the write control table 121d-1, the write status flags 1211 at the entries 1210-1 and 1210-2 outside of the output request range are not changed. The write status flags at the entries 1210-3 and 1210-4 corresponding to the blocks 310-3 and 310-4 on which the output request range 312 overlaps the defective write range 311, are initialized to the writing status (W). The write status flags at the entries 1210-5 to 1210-7 corresponding to the blocks 310-5 to 310-7 on which the output request range 312 does not overlap the defective write range 311, are initialized to the no write indication status (U). When data write to the output request range 312 is completed, all the write status flags at the entries 121-3 to 1210-7 corresponding to the blocks 310-3 to 310-7 are set to the write completed status (C), as shown in write control tables 121e-1 and 121e-2. The write control table 121e-2 is released because all the write status flags thereof indicate the write completed status (C). However, the write control table 121e-2 is not released but remains stored in the non-volatile memory 12 because the write status flag representing the writing status (W) is left at the entry 1210-2 corresponding to the block 310-2 remaining as the defective write range. If an output request which overwrites data on the whole area of the defective write range 311, is executed, the write status flag at the entry 1210-2 indicates the write completed status, so that the write control table 121-1 can be released. In the foregoing, an example of managing the write status by using a bit map has been described. Other control methods are also possible by using information representative of the data write range.

Figure 9:
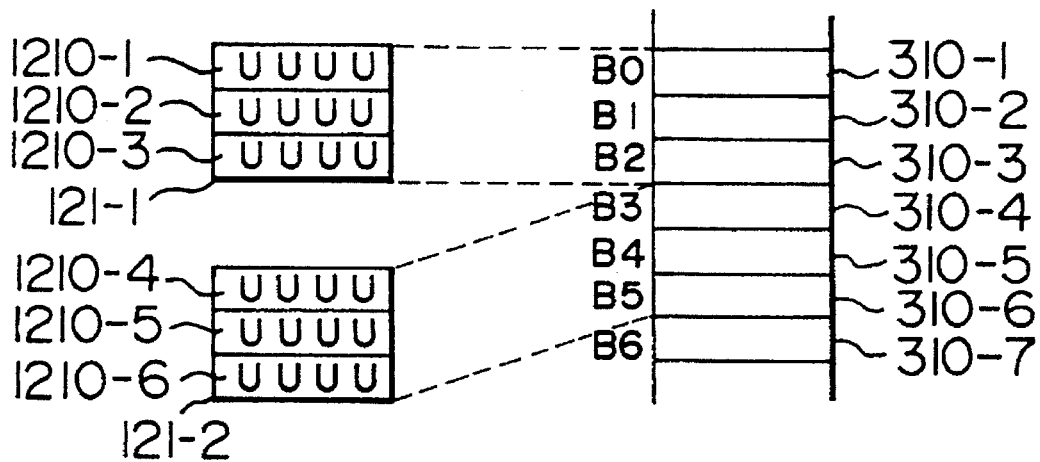
FIG. 9 shows multiple buffering type write control tables.
Figure 10:
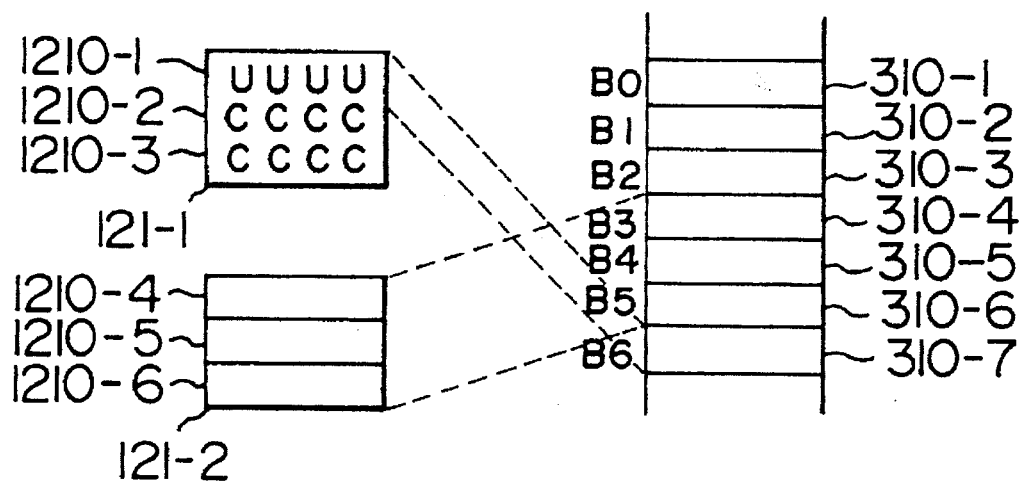
FIG. 10 shows multiple buffering type write control tables.

FIGS. 9 and 10 illustrate an embodiment of a multiple buffering method for write control tables. In FIGS. 9 and 10, it is assumed that blocks 310-1 to 310-7 are allocated as an output request range, and write control tables 121-1 and 121-2 each manage write status flags of three blocks. The number of entries of each write control table and the number of write control tables assigned to one output request are not limited to those used in this embodiment. In the initial stage, the blocks 310-1 to 310-3 are assigned the write control table 121-1, and the blocks 310-4 to 310-6 are assigned the write control table 121-2. All the write status flags are initialized to the no write indication status (U). The block 310-7 is not assigned a write control table.

As data write to disk drives proceeds and is completed for the blocks 310-1 to 310-3, all the write status flags of the write control table 121-1 are set to the write completed status (C). Even in this condition, the write control table 121-1 is not released, but as shown in FIG. 10, the entry 1210-1 of the write control table 121-1 is assigned to the block 310-7 which has been assigned no entry until then, and the write status flags are initialized to the no write indication status (U). The write status flags for the entries 1210-2 and 1210-3 having no blocks to be allocated, are maintained as the write completed status (C). As data write to disk drives further proceeds and is completed for the blocks 310-4 to 310-6, all the write status flags of the write control table 121-2 are set to the write completed status (C). In this case, the write control table 121-2 becomes unnecessary and is released because at this time there is no block for which although the output request was issued, an entry of the write control table is not assigned as yet. Similarly, after data write to the block 310-7 is completed and when all the write status flags of the write control table 121-1 indicate the write completed status (C), the write control table 121-1 also becomes unnecessary and is released. Also in this embodiment, the defective write range can be identified by searching the write control tables stored in the non-volatile memory, even if a power is cut during the data output process.

Figure 11:
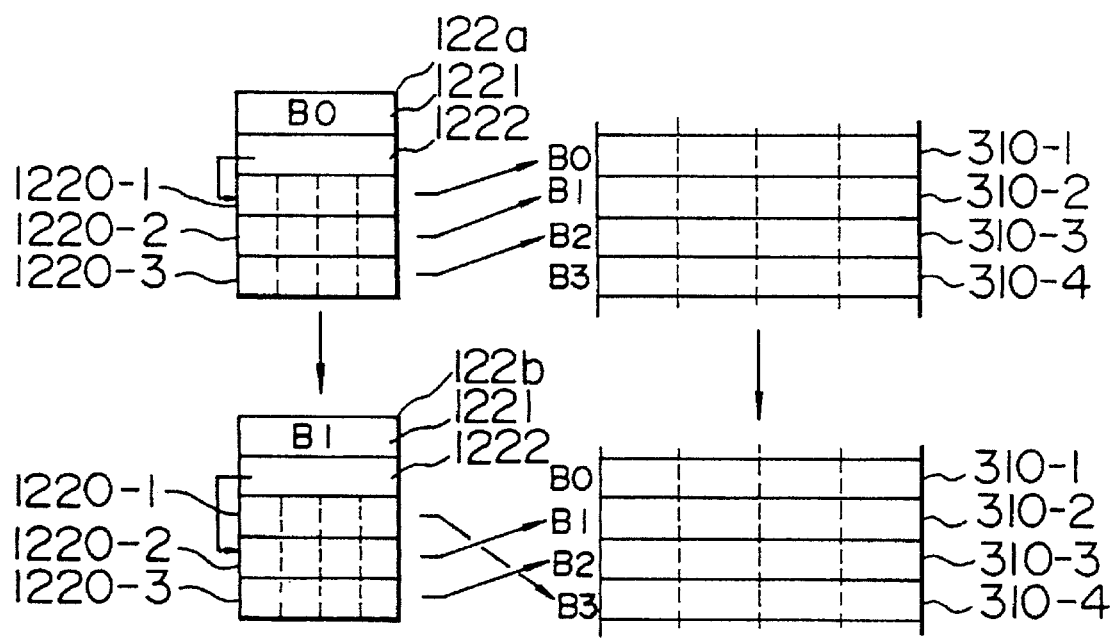
FIG. 11 shows ring buffering type write control tables.

Next, the operation of a ring buffering method for write control tables will be described with reference to FIG. 11. A write control table 122a shows an example of the initial state of a ring buffered write control table. Each entry 1220-1 to 1220-3 has write status flags for each block of the drive group. If the write range corresponds to blocks 310-1 to 310-4, all write statuses of the write range cannot be managed only by the entries 1220-1 to 1220-3. For this reason, as shown in the write control table 122a, the write statuses of the blocks 310-1 to 310-3 are stored in the entries 1220-1 to 1220-3 at the initial stage. A head block address field 1221 stores the head address of blocks whose write statuses are stored in the write control table 122a, 122b. A head entry pointer field 1222 stores a pointer to an entry of the write control table 122a, 122b actually storing the write status. As seen from the write control table 122a, at the initial stage, the address of the block 310-1 is stored in the head block address field 1221. The head entry pointer field 1222 indicates the entry 1220-1 for storing the write status of the block 310-1. When data write to the block 310-1 is completed and all the write statuses of the entry 1220-1 indicate the write completed status (C), the address of the block 310-2 is stored in the head block address field 1221 as seen from the write control table 122b. With this new address, the head entry pointer 1222 is incremented to indicate the entry 1220-2 for storing the write of the block 310-2. As a result, the entry 1220-1 of the write control table 122b is used for the block 310-4. The write statuses at an entry of the write control table with a new block assigned, are generally initialized to the no write indication status (U).

Figure 12:
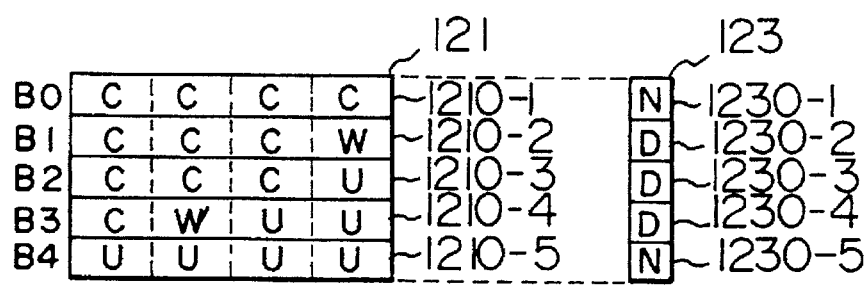
FIG. 12 shows the outline of a defective write control table.

FIG. 12 shows an example of the contents of a defective write control table 123 corresponding to a write control table 121. The defective write control table 123 is allocated within the non-volatile memory 12 and stores information representing whether each of the blocks corresponding to defective write flags 1230-1 to 1230-5 is in a defective write status or not. The defective write flag may be assigned to all blocks in advance. In this embodiment, however, the defective write table 123 is adapted to cover only those blocks near the defective write range.

If the write control table 121 is present in the non-volatile memory 12 at the initial settings, a defective write control table 123 is allocated within the non-volatile memory 12. Next, the entries 1210-1 to 1210-5 of the write control table 121 are searched. In accordance with this search results, the defective write flags of the defective write control table 123 are set to a defective write status (D) for a block in the defective write status, and set to a normal write status (N) for a block in the normal write status. Since the defective write flag is required to discriminate between two statuses, it is sufficient if one bit is assigned to this flag. In the example shown in FIG. 12, blocks for the entries 1210-1 and 1210-5 of the write control table are assumed to be in the normal write status, and blocks for the entries 1210-2 to 1210-4 are assumed to be in the defective write status. Therefore, the normal write status (N) is set to the defective write flags 1230-1 and 1230-5, and the defective write status (D) is set to the defective write flags 1230-2 to 1230-4. After the flag settings of the defective write control table 123 are completed, the write control table 121 is released. Whether a block for the input/output target is in a defective write status can be judged only from the defective write flag bit of the defective write control table 123.

2) 2nd Embodiment

Figure 13:
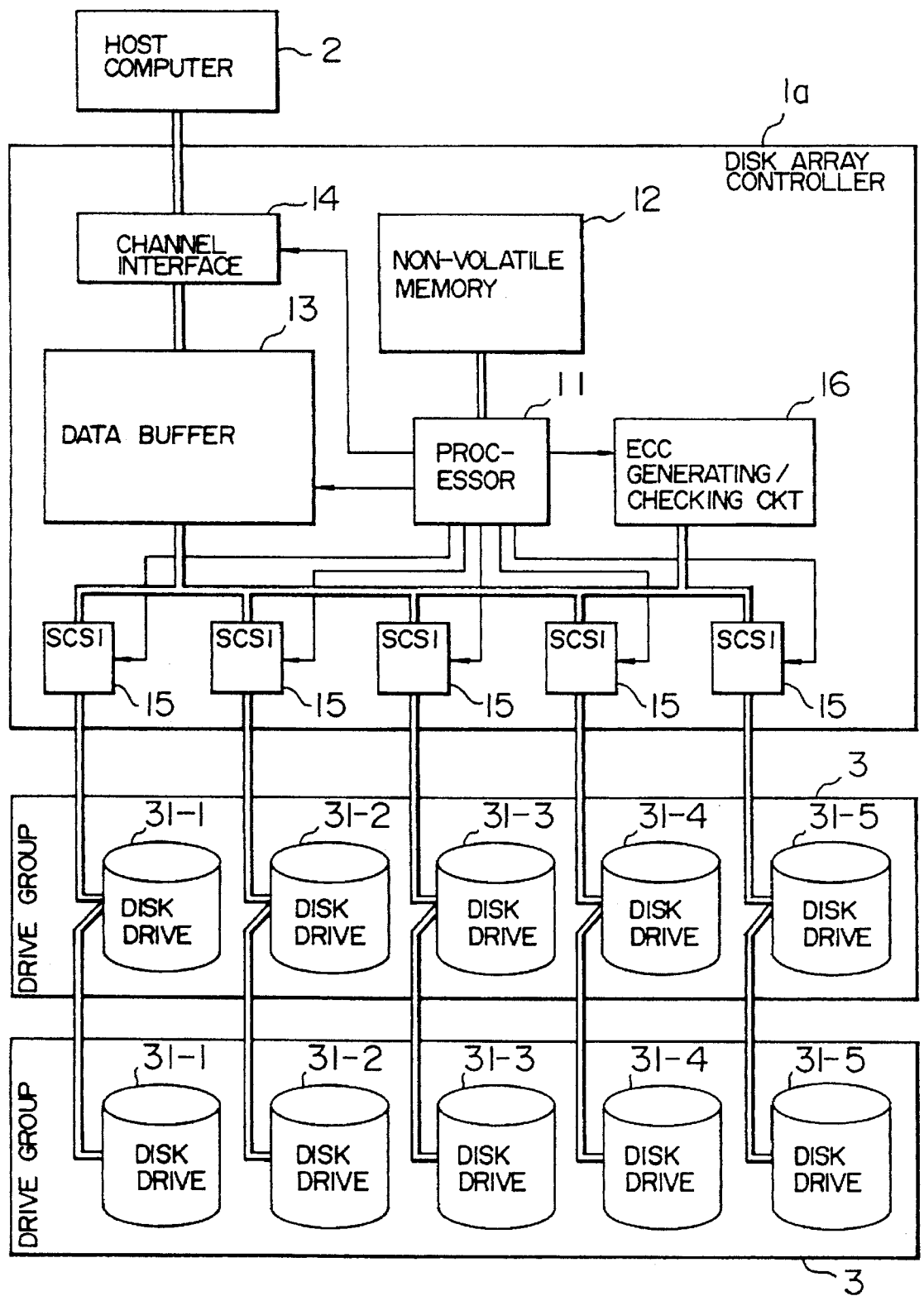
FIG. 13 shows the configuration of a computer system having a disk array controller according to a second embodiment of the present invention.

In the second embodiment, a disk array controller with redundancy will be described. FIG. 13 shows an example of the system configuration of a disk array controller 1a having redundancy. An error correcting code (ECC) generating/checking circuit 16 generates error correcting/checking codes (hereinafter referred to as ECC) from data, and checks and corrects errors by using ECC. Components other than the ECC generating/checking circuit 16 shown in FIG. 13 are substantially the same as those shown in FIG. 1. A disk drive 31-5 for storing ECC is added. The number of disk drives per one drive group 3 to be added for the storage of ECC changes with the degree of redundancy. FIG. 13 shows the case where the degree of redundance is "1". It is not necessary to store ECC in the added disk drive 31-5 in a fixed manner. For example, an approach called striping is known in which disk drives for storing ECC are exchanged in units of several blocks. For the simplicity sake, in this embodiment, data is stored in disk drives 31-1 to 31-4, and ECC is stored in the disk drive 31-5.

Figure 14:
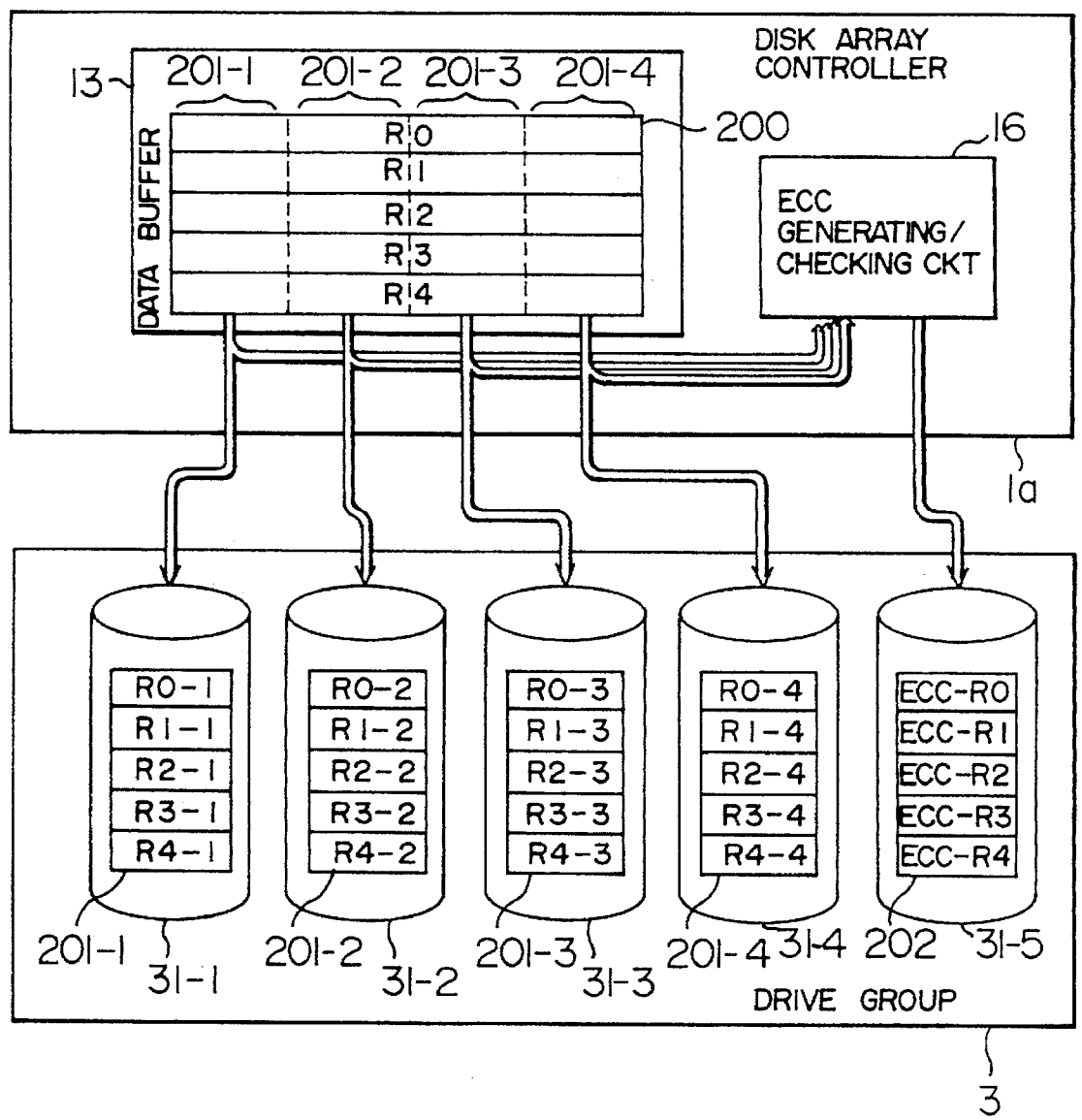
FIG. 14 illustrates data division and ECC data generation according to the second embodiment.

FIG. 14 illustrates data division and ECC data generation according to the second embodiment. Data stored in a data buffer 13 is divided into divisional data 201-1 to 201-4 corresponding in number to the disk drives 31-1 to 31-4. The divisional data 201-1 to 201-4 is inputted to the ECC generating/checking circuit 16 to generate ECC data 202 for each block which data is stored in the disk drive 31-5.

Figure 15:
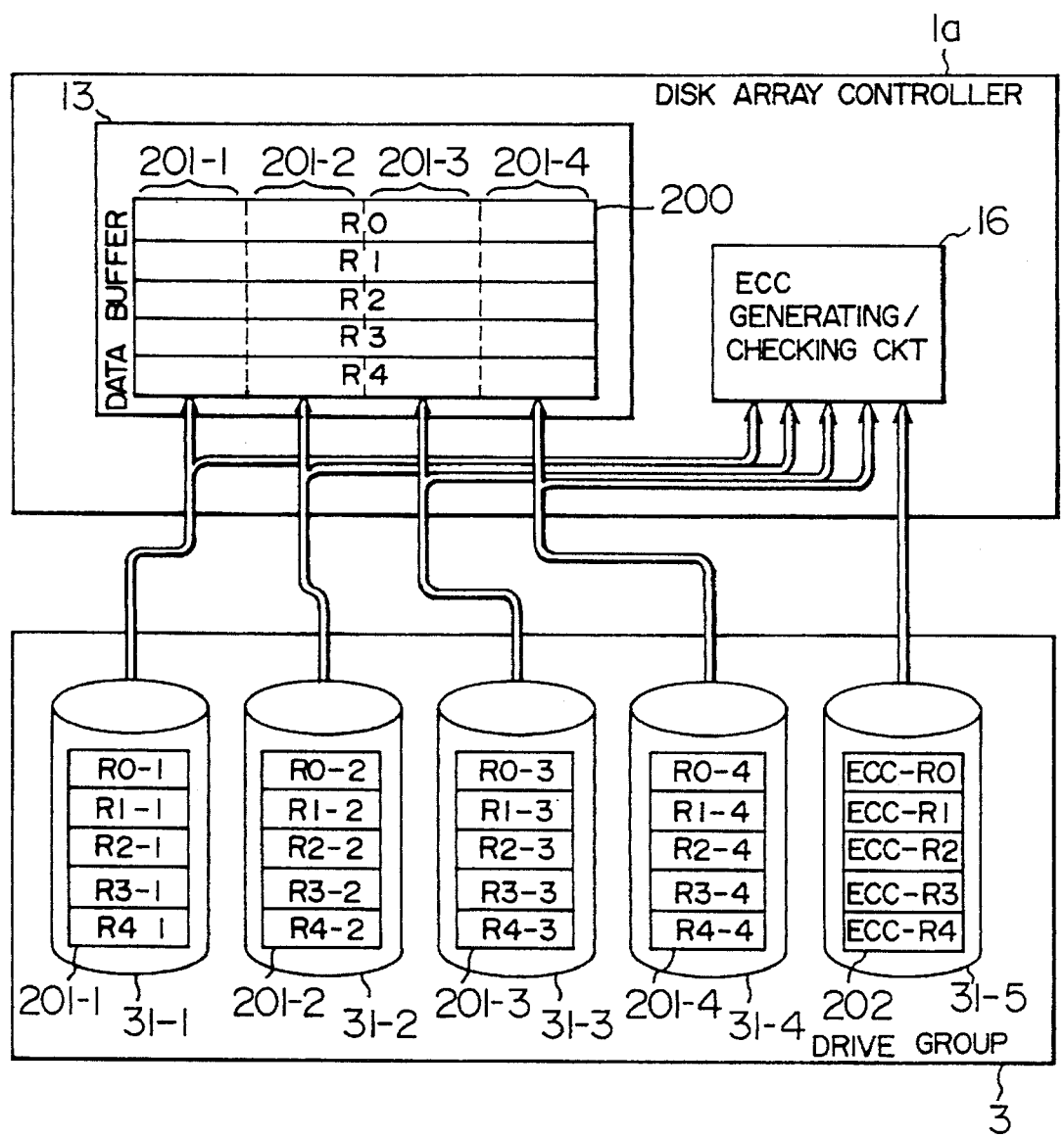
FIG. 15 illustrates data assembly and check according to the second embodiment.

FIG. 15 illustrates data assembly and ECC data check. As shown in FIG. 15, when data is read from the drive group 3, divisional data 201-1 to 201-4 is assembled as data 200. The data 200 and ECC data 202 are inputted to the ECC generating/checking circuit 16 to check the presence/absence of errors. This ECC check is not necessarily required to be executed at the time of data read, because the abnormal data is checked for each physical block of the disk array controller 1a or each disk drive 31-1 to 31-5.

Figure 16:
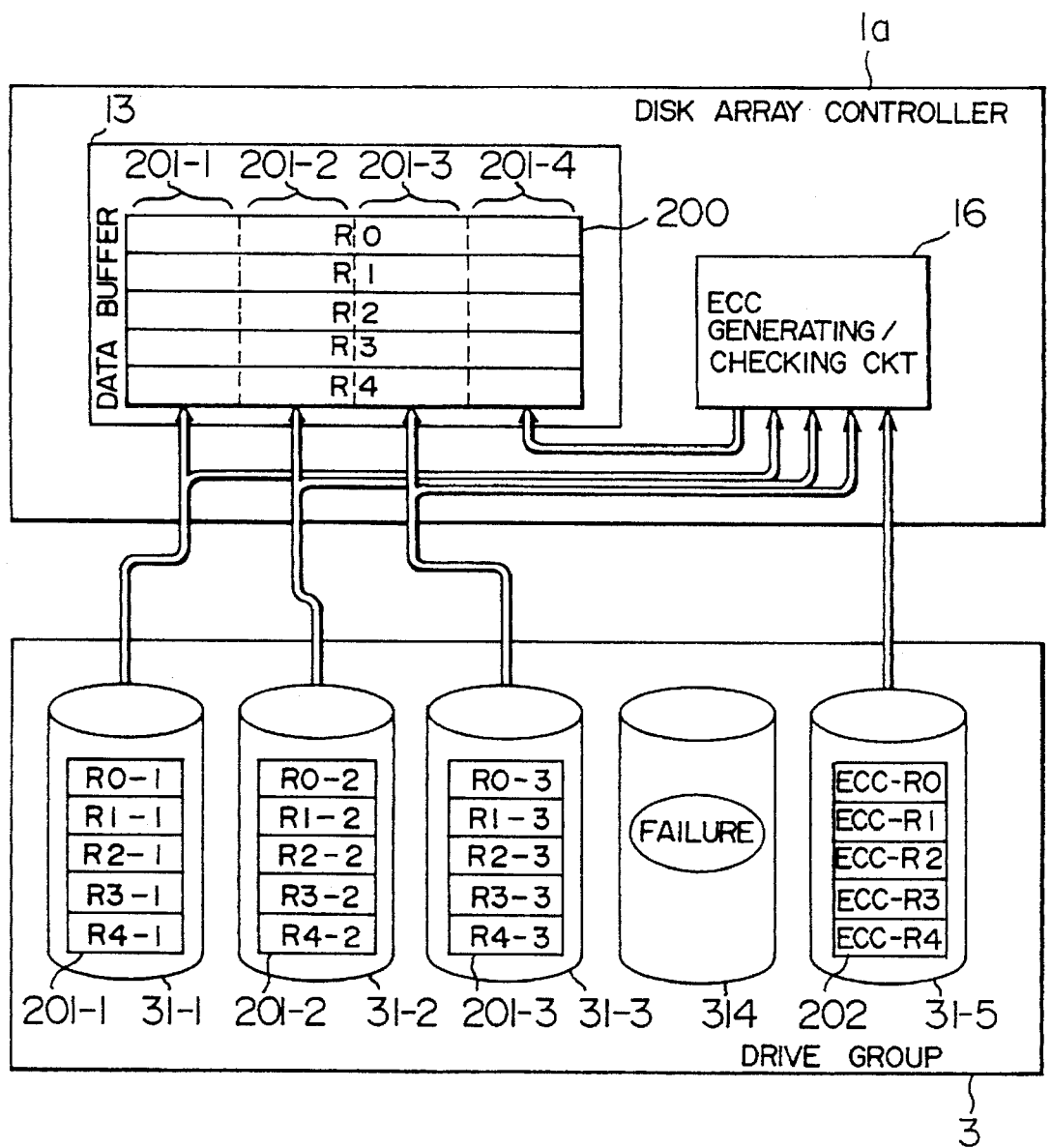
FIG. 16 illustrates data correction according to the second embodiment.

With the disk array controller 1a having redundancy, data correction by ECC is possible even if data of some defective disk drives cannot be used, so long as the number of defective disk drives is less than the degree of redundancy. In the case of the disk array controller 1a shown in FIG. 13, the degree of redundancy is "1" so that data can be recovered even if one of the disk drives constituting the drive group 3 becomes defective. FIG. 16 illustrates how data is corrected by using ECC. It is assumed the disk drive 31-4 shown in FIG. 16 is defective. The divisional data 201-1 to 201-3 read from the disk drives 31-1 to 31-3 and ECC data 202 read from the disk drive 31-5 are inputted to the ECC generating/checking circuit 16 to generate the missing divisional data 201-3 of the disk drive 31-4. The generated divisional data 201-4 is assembled with the divisional data 201-1 to 201-3 read from the disk drives 31-1 to 31-3.

Figure 17:
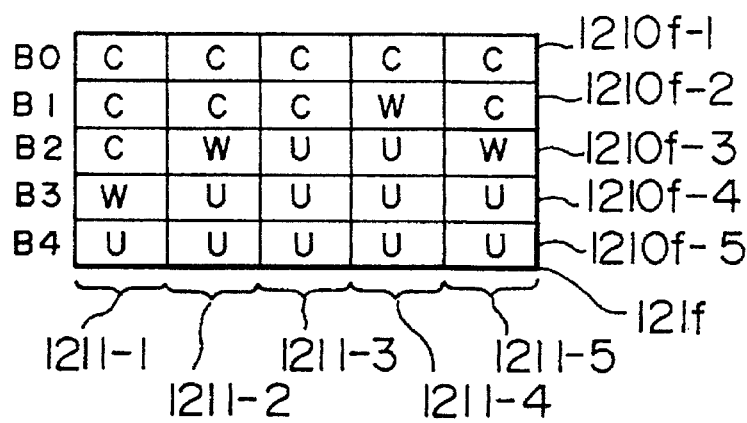
FIG. 17 shows an example of settings of a write control table.

An example of settings of a write control table according to the second embodiment is shown in FIG. 17. As seen from FIG. 17, a write control table 121f stored in the non-volatile memory 12 of the disk array controller 1a has additional write status flags 1211-1 to 1211-5 for storing the write statuses of the added disk drive. The initial settings of the write control table 121f and the method of setting the write status flags 1211-1 to 1211-5 are the same as the first embodiment. Similar to the first embodiment, the write control table is managed by the multiple buffering method illustrated in FIGS. 9 and 10 or by the ring buffering method illustrated in FIG. 11.

Figure 18A:
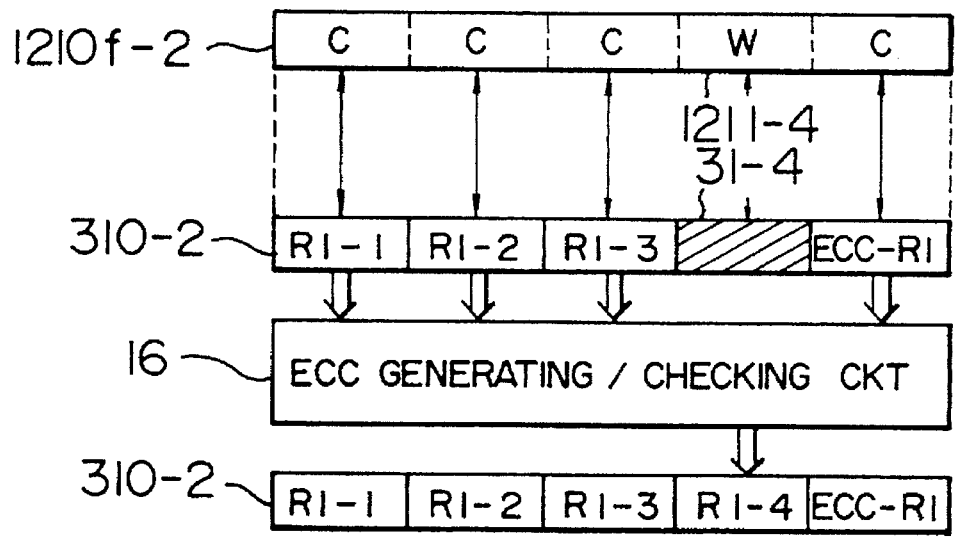
FIGS. 18A and 18B illustrate data recovery from a recoverable defective write range.
Figure 18B:
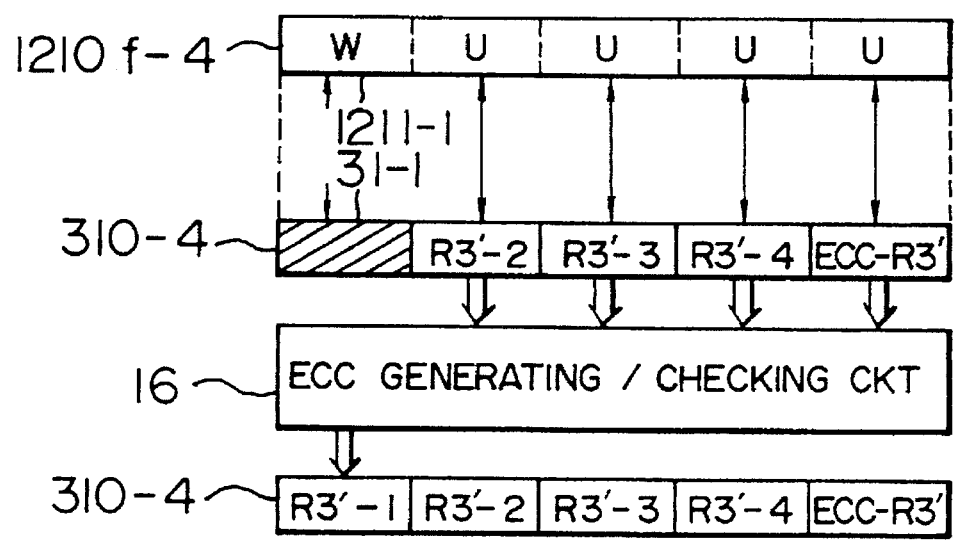

Next, the description will be given for the recovery of data in the defective write range by the disk array controller 1a. As described with FIG. 16, the disk array controller 1a can recover missed data less than the redundance degree, by using ECC. For example, consider the case shown in FIG. 17, wherein the blocks corresponding to entries 1210f-2 to 1210f-4 are in the defective write status. In the block corresponding to the entry 1210f-2, only one disk drive is in the writing status and all the others are in the write completed status (C). Also in the block corresponding to the entry 1210f-4, only one disk drive is in the writing status and all the others are in the no write indication status (U). In both the cases, the number of unusable disk drives is less than the degree of redundancy of the disk array controller 1a, so that the block data can be recovered by using ECC. FIGS. 18A and 18B illustrate how data in the recoverable defective write range can be recovered. First, for the block 310-2 corresponding to the entry 1210f-2, the divisional data of the block 310-2 is inputted, from the disk drives other than the disk drive 31-4 corresponding to the write status flag 1211-4 representing the writing status (W), to the ECC generating/checking circuit 16 to generate data for the disk drive 31-4. By assembling the generated data with the divisional data of the disk drives other than the disk drive 31-4, it is possible to obtain complete data. Similarly, for the block 310-4, complete data for the block 31-4 can be obtained by using the divisional data of the block 310-4 from the disk drives other than the disk drive 31-1, and by using the data of the block 310-4 of the disk drive 31-1 generated by the ECC generating/checking circuit 16. The different point between two cases resides in that data after the write operation is recovered for the block 310-2, whereas data before the write operation is recovered for the block 310-4.

Also for the disk array controller 1a with redundancy, the defective write control table 123 can be used in place of the write control table 121f. For the disk array controller 1a with redundancy, the block write statuses include the normal write status, recoverable defective write status, and unrecoverable defective write status. In the case of the recoverable defective write status, it is necessary to store information for determining data of which disk drive is to be recovered. To solve this problem, at the initial settings, data of the block in the recoverable defective write status is first recovered, and thereafter settings of the defective write control table are performed. After the data recovery of a block under the recoverable defective write status, the block write statuses are only the normal write status and unrecoverable defective write status, like the case of a disk array controller without redundancy.

Figure 19:
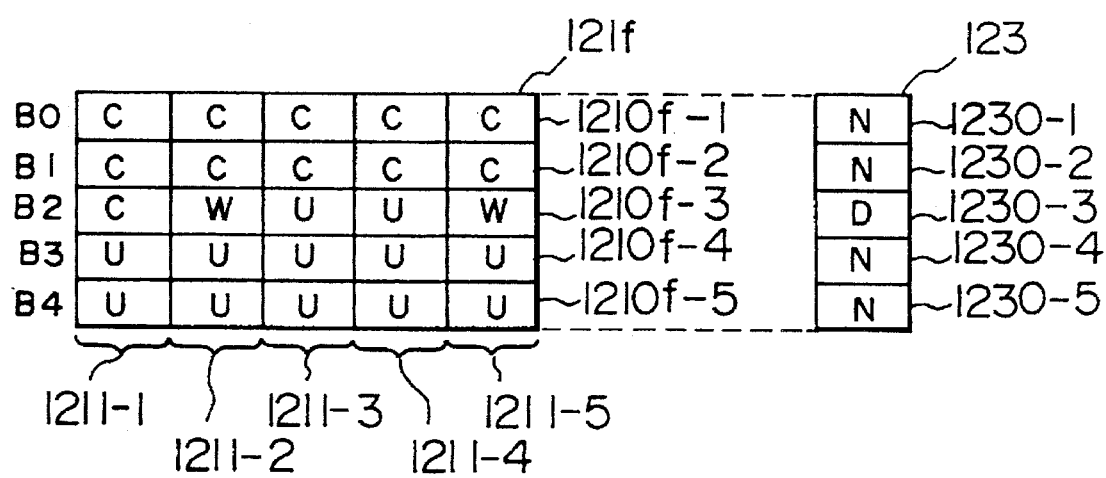
FIG. 19 shows the contents of the write control table after the data recovery from a defective write range, and settings of the defective write control table.

In the write control table 121f shown in FIG. 17, the blocks corresponding to the entries 1210f-2 to 1210f-4 take the defective write status. Of these blocks, the blocks 310-2 and 310-4 corresponding to the entries 1210f-2 and 1210f-4 take the recoverable defective write state, as shown in FIGS. 18A and 18B. Accordingly, as described above, first the blocks 310-2 and 310-4 are recovered. The write control table after the recovery of the blocks 310-2 and 310-4 becomes as shown in FIG. 19. In this table, all the write status flags at the entries 1210f-2 and 1210f-4 are in the write completed status (W) or no write indication status (U), namely, these flags indicate the normal write status. As a result, as seen from the defective write control table shown in FIG. 19, only the defective write flag 1230-3 corresponding to the entry 1210f-3 representing the unrecoverable defective write status is set to the defective write status (D), and all the other defective write flags 1230-1, 1230-2, 1230-4, and 1230-5 are set to the normal write status (N). After the recovery of the blocks under the recoverable defective write status and after the settings of the defective write control table 123, the write control table 121f is released.

3) 3rd Embodiment

Figure 20:
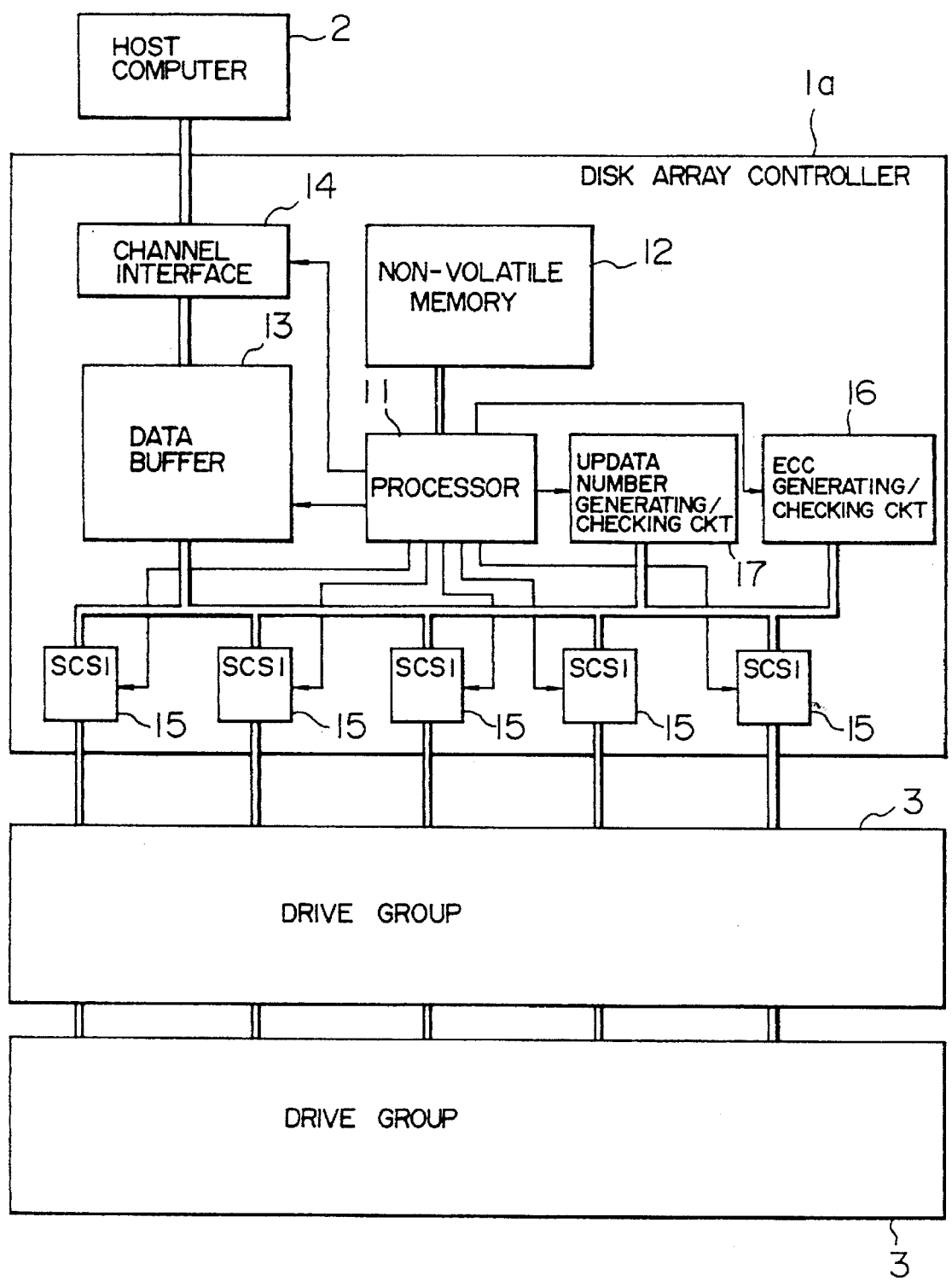
FIG. 20 shows the configuration of a computer system having a disk array controller according to a third embodiment of the present invention.

FIG. 20 shows the system arrangement of a disk array controller 1b according to the third embodiment. The disk array controller 1b has an update number generating/checking circuit 17 added to the structure of the disk array controller 1a shown in FIG. 13. The other components are the same as those shown in FIG. 13. For the simplicity of the drawing, disk drives 31-1 to 31-5 of the disk drive 3 are omitted in FIG. 20.

Figure 21:
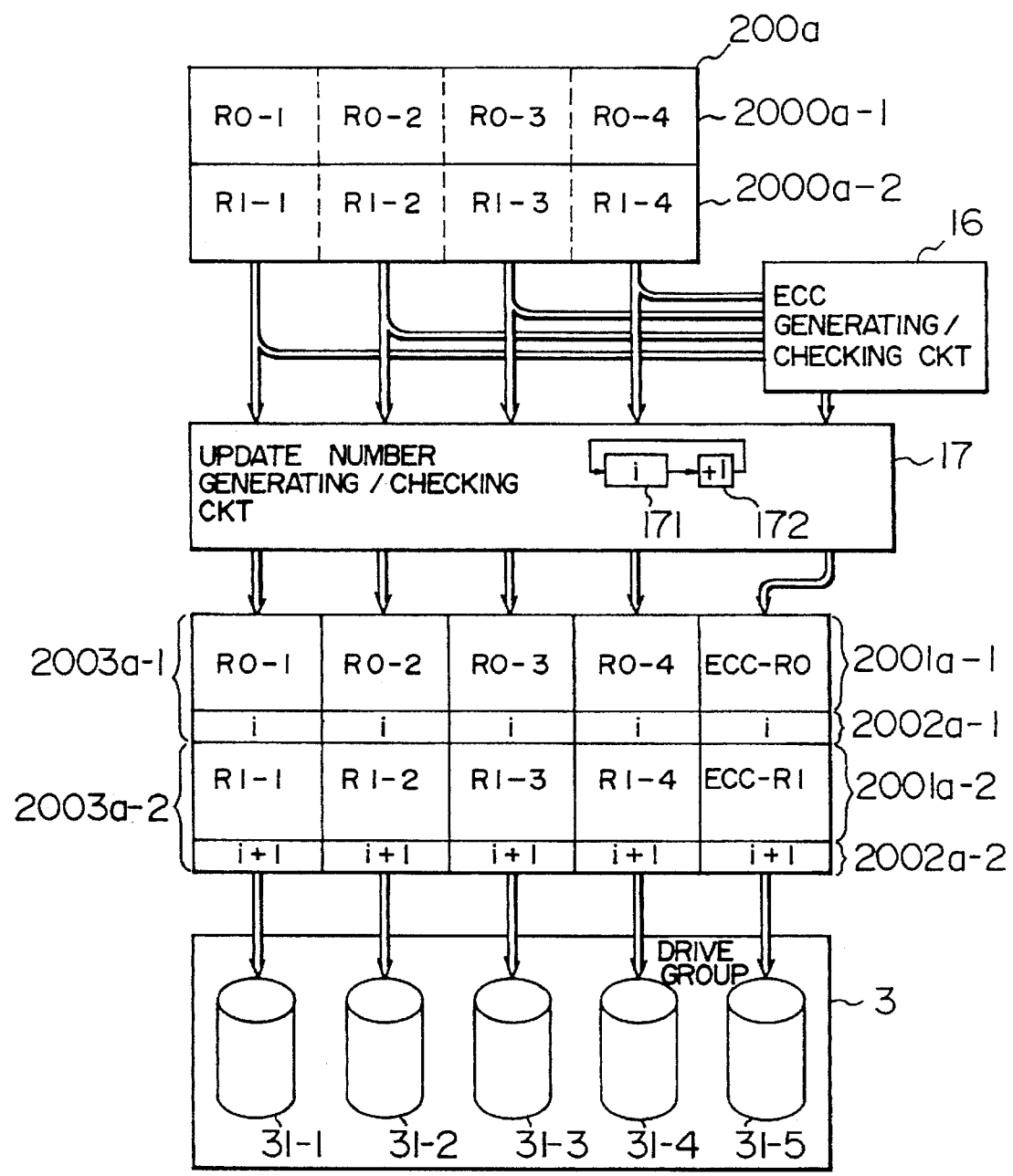
FIG. 21 illustrates addition of update numbers according to the third embodiment.

FIG. 21 shows the flow of data 200a stored in the data buffer 13 which is written in a drive group 3. Data 200a is constructed of records 2000a-1 and 2000a-2. The records 2000a-1 and 2000a-2 are inputted to the ECC generating/checking circuit 17 to generate ECC. In the update generating/checking circuit 17, the same update number 2002a-1 is added to the record 2000a-1 and to the generated ECC, and the same number 2002a-2 is added to the record 2000a-2, to generate new records 2003a-1 and 2003a-2 and store the new records in the disk drives 31-1 to 31-5 of the drive group 3. The update number is a value stored in and outputted from an update number register 171 of the update number generating/checking circuit 17. The update number is renewed for each record by an update function 172. In FIG. 21, the update function 172 is an addition of "1" by way of example. In the example shown in FIG. 1, the initial value of the update number register 171 is added to the first record 2001a-1 and the update number 2002a-2 is added to the second record 2001a-2, to thereafter store the new records 2003a-1 and 2003a-2.

Figure 22:
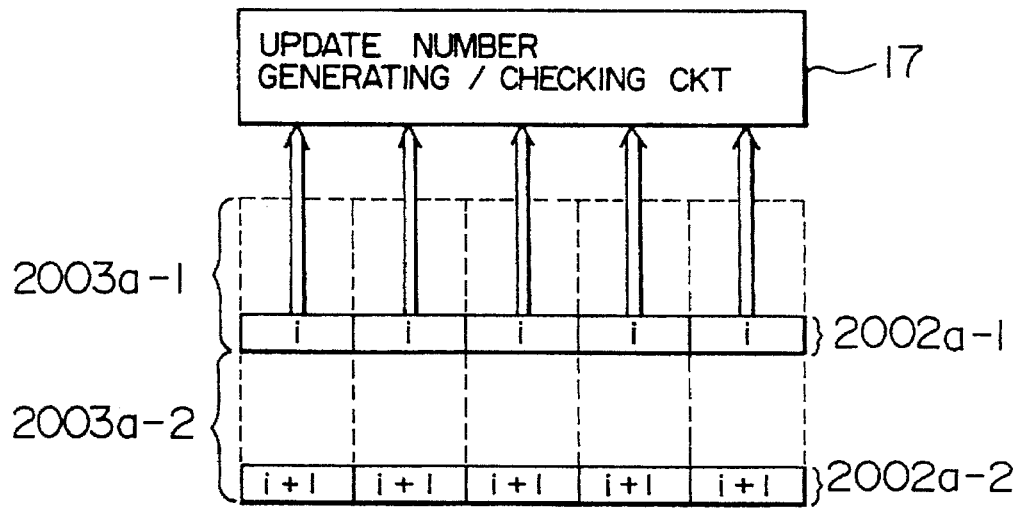
FIG. 22 illustrates check of update numbers according to the third embodiment.

FIG. 22 illustrates the method of checking an update number when the records 2003a-1 and 2003a-2 are inputted. Only the update numbers 2002a-1 and 2002a-2 of the records 2003a-1 and 2003a-2 are inputted to the update number generating/checking circuit 17 to check whether any update number different from the update numbers 2002a-1 and 2002a-2 is present. If data write was executed in units of a drive group 3, data read from the disk drives 31-1 to 31-5 at the same block address should have the same update number. Therefore, if the update numbers of the data read from the disk drives 31-1 to 31-5 at the same block address are different, it means that some disk drives of the drive group 3 are defective because some troubles occurred during the data write and data was not written correctly.

Specifically, upon reception of an input request of the record 2003a-1 from the host computer 2, the update number generating/checking circuit 17 checks whether all update numbers of the record 2003a-1 are the identical update number 2002a-1 or not. If there is any different update number, the following processes are executed depending upon the number of update numbers different from the update number 2002a-1.

Figure 27:
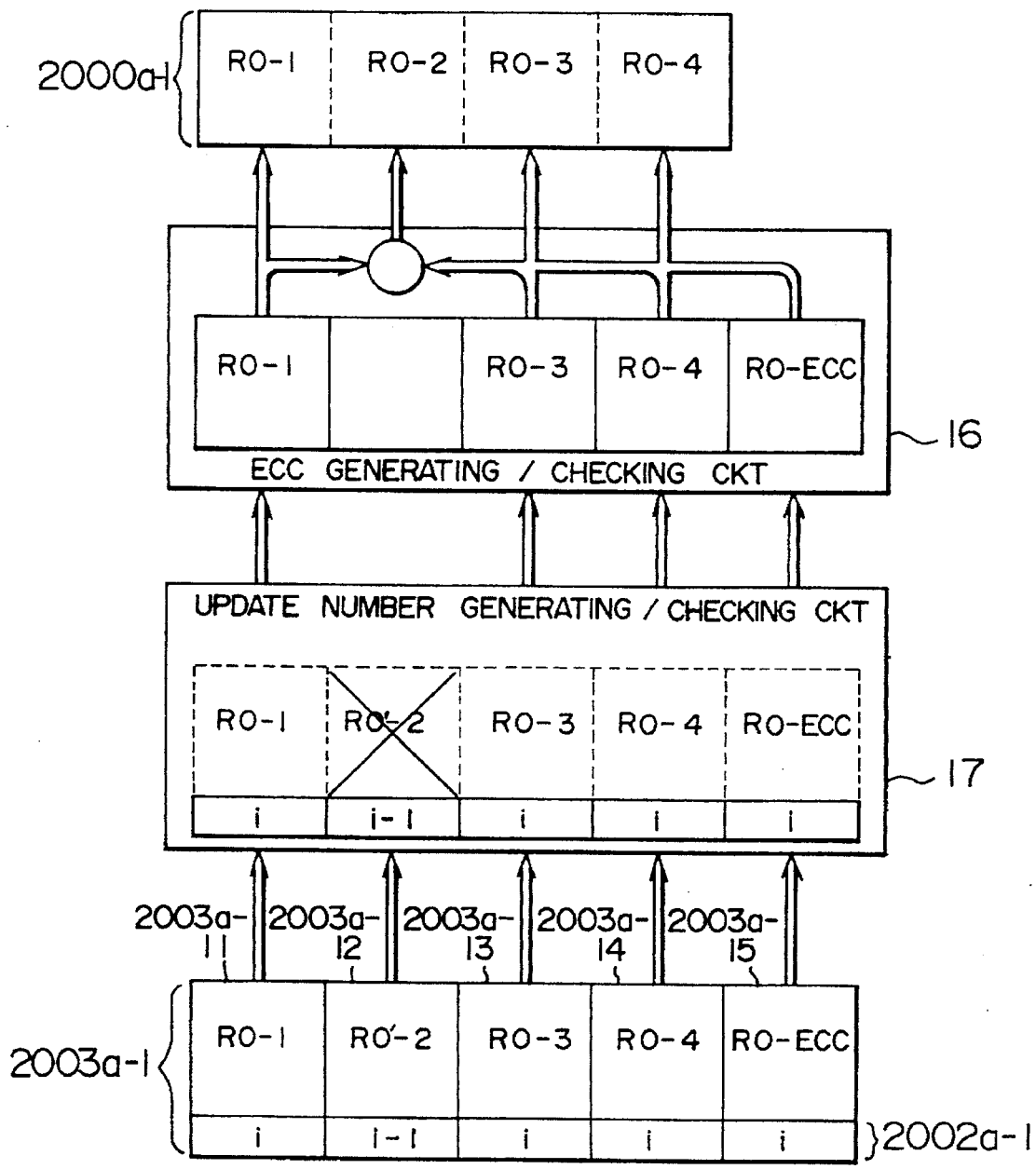
FIG. 27 illustrates an example of a read error where the number of different update numbers is equal to or less than the redundancy degree according to the third embodiment.

FIG. 27 illustrates the case where the number of update numbers different from the Update number 2002a-1 is less than the degree of redundancy. A block 2003a-15 is a redundant block for the record 2000a-1, and a block 2003a-12 is a block which was judged as a read error because of its update number 2002a-1. In this example, the number of update numbers different from the update number 2002a-1 is 1, which is equal to the degree of redundancy of the disk array controller 1b. It is therefore possible to recover the data of the read defective block 2003a-12, by supplying the correctly read blocks 2003a-11, and 2003a-13 to 2003a-15 to the ECC generating/checking circuit 16. The ECC generating/checking circuit 16 assembles the recovered block 2003a-12 with the blocks 2003a-11, and 2003a-13 to 2003a-15, and sends them as the record 200a-1 to the host computer 2.

Figure 28:
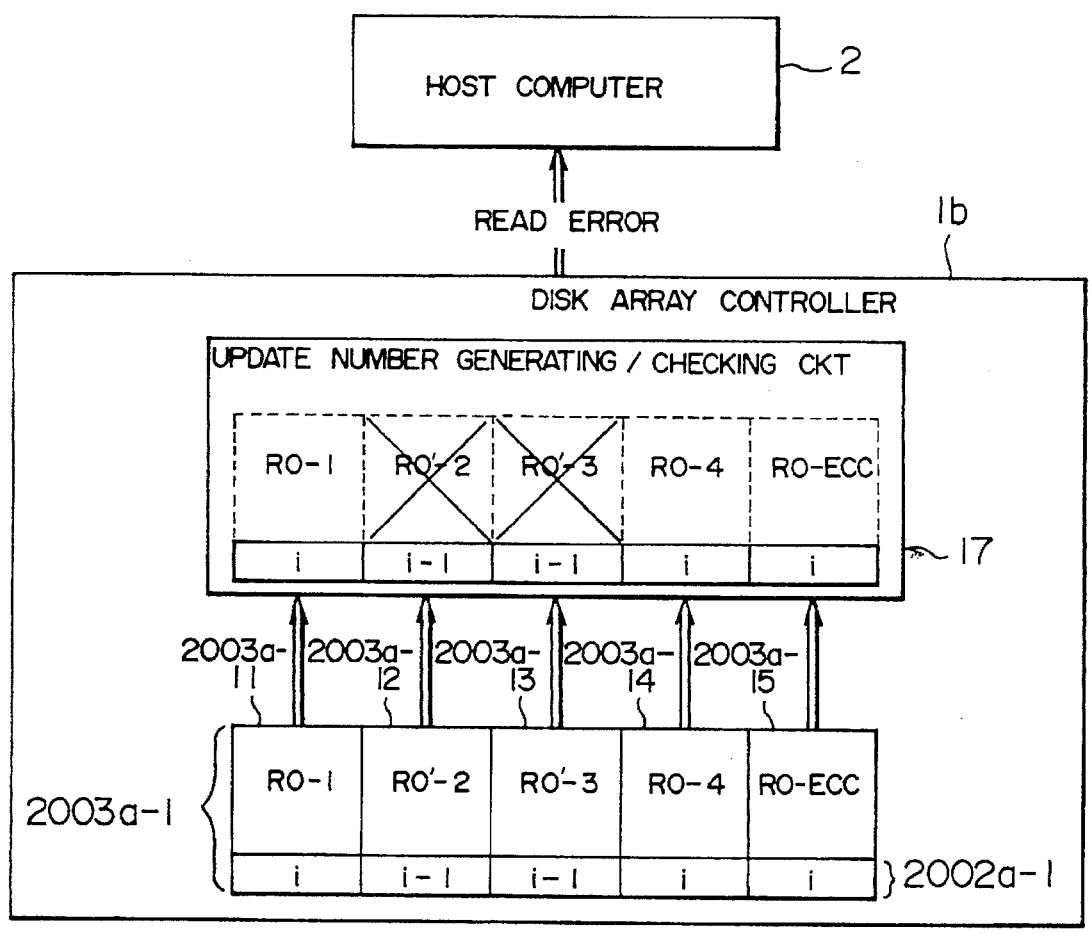
FIG. 28 illustrates an example of a read error where the number of different update numbers is greater than the redundancy degree according to the third embodiment.

FIG. 28 illustrates the case where the number of update numbers different from the update number 2002a-1 is in excess of the degree of redundancy. Blocks 2003a-12 and 2003a-13 are blocks judged as read defective blocks because of their different update numbers 2002a-1. The number of different update numbers is 2, which is over the degree of redundancy "1" of the disk array controller 1b. It is therefore impossible to recover the read defective blocks 2003a-12 and 2003a-13 by using the correctly read blocks 2003a-11, 2003a-14, and 2003a-15. In this case, a read error is informed to the host computer 2. If the disk array controller 1b has no redundancy, a read error is informed to the host computer 2 even if there is one different update number.

Figure 24:
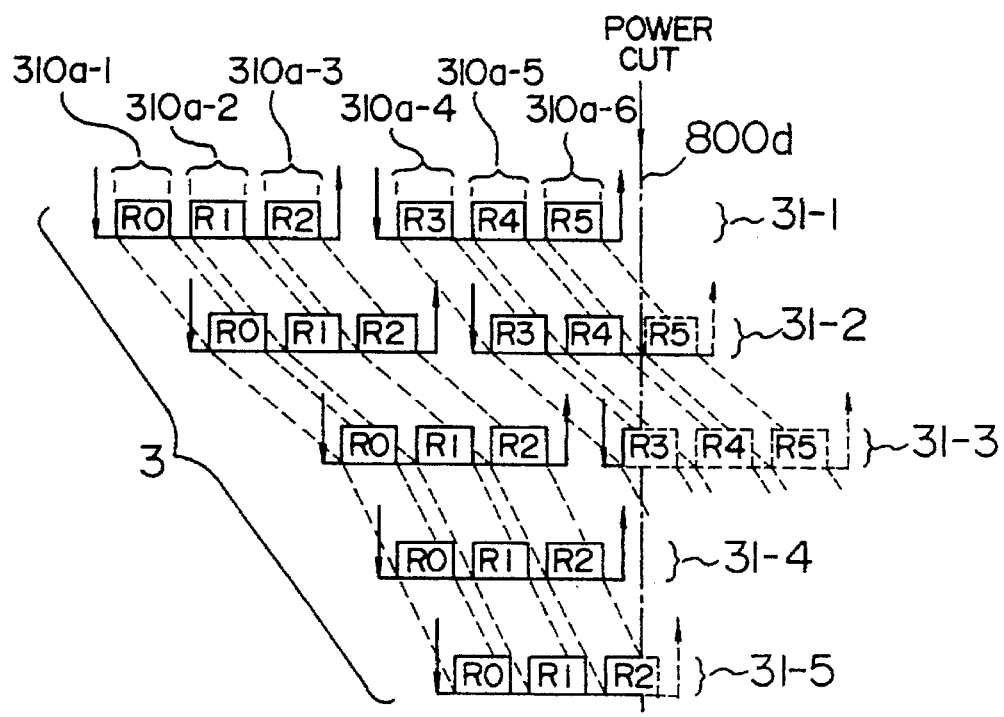
FIG. 24 show timings of data write to disk drives, with a power cut being involved.
Figure 23:
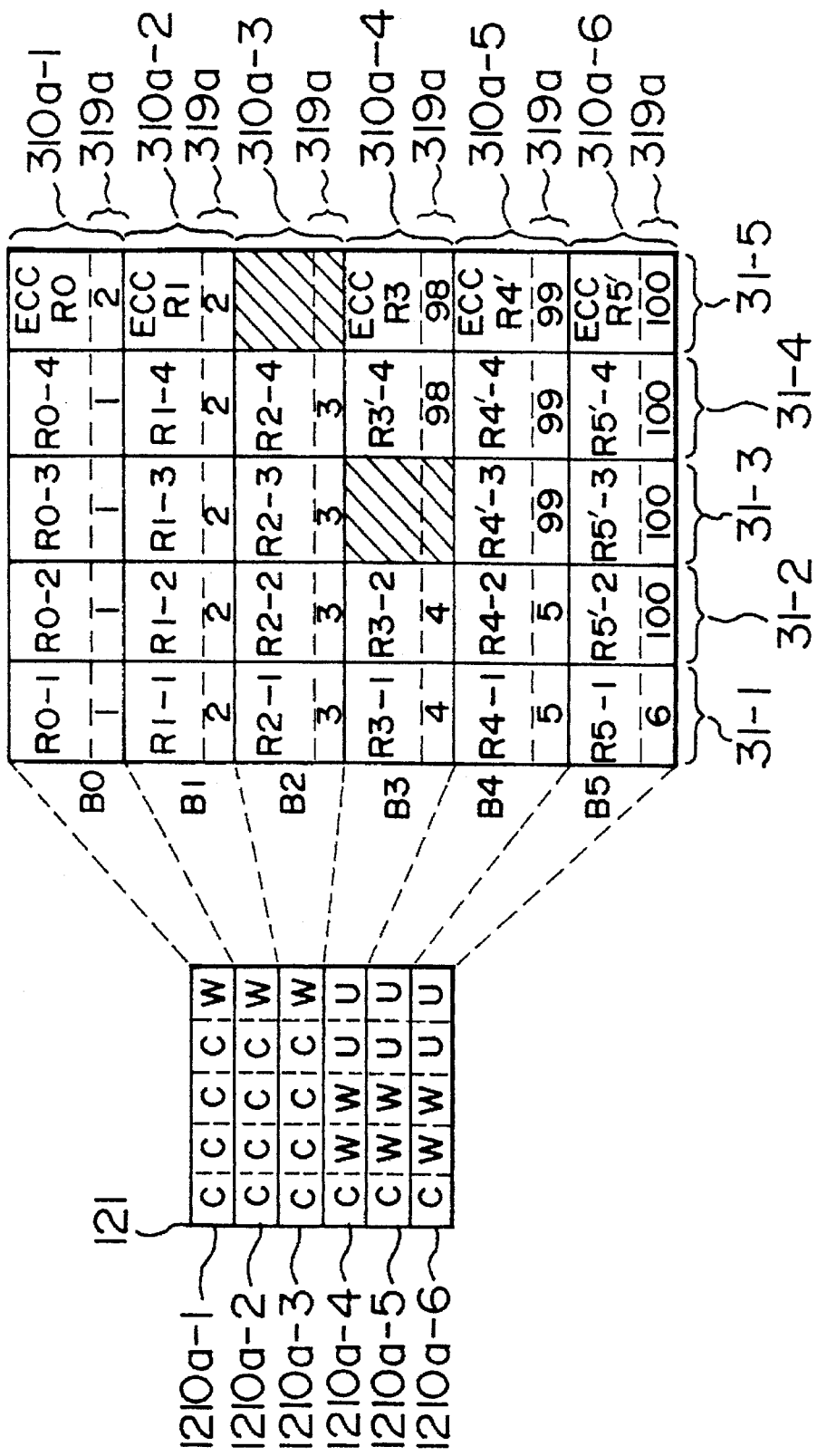
FIG. 23 shows an example of the write control table used for writing data to a plurality of blocks of disk drives at the same time, and data write to the disk drives.

Referring to FIGS. 24 and 23, the description will be given for the case where write commands are issued collectively for a plurality of blocks. FIG. 24 is a timing chart illustrating a write interruption of disk drives caused by a power cut. In writing data to disk drives 31-1 to 31-5 shown in FIG. 24, write commands are issued to three blocks at the same time. Therefore, the write status settings to the write control table are required to be executed in units of three blocks.

The contents of the write control table at a timing 800d when a power cut occurs, are exemplary shown in the write control table 121 of FIG. 23. The write control table 121 shown in FIG. 23 provides an example of write statuses of disk drives for the case where a plurality of blocks of disk drives are instructed to write data at the same time. Since the write request issue and write completion response are performed in units of three blocks, the write statuses for three blocks are set to the writing status (W) at the same time when the write request is issued, and to the write completed status (C) at the same time when the write completion response is received. As a result, as seen from the write control table 121 of FIG. 23, the consecutive entries for three blocks, entries 1210a-1 to 1210a-3 and entries 1210a-4 to 1210a-6, have the same write statuses.

At the timing 800d shown in FIG. 24 when the power is cut and the data write is interrupted, the write statuses of the write control table 121 become as shown in FIG. 23. According to the contents of the entries 1210a-1 to 1210a-3 of the write control table 121, the blocks 310a-1 to 310a-3 can be recovered. On the other hand, according to the contents of the entries 1210a-4 to 1210a-6, all data of the blocks 310a-4 to 310a-6 are judged as unrecoverable. However, in practice, data of the disk block 310a-6 before the data write is still stored in the disk drives except the disk drive 31-1, and can be recovered.

In the above manner, in the case where data write is instructed to a plurality of blocks of the disk drives 31-1 to 31-5 at the same time, data can be recovered in some cases in practice even if it is judged unrecoverable from the contents of the write control table after the data write interruption caused by the power cut or the like. Namely, in the write control table 121, the write status indicating the writing status (W) may be actually the now rite indication status (U) or write completed status (C). Therefore, if the number of write completed statuses (C) or no write indication statuses (U) is less than the degree of redundancy, data can be recovered in some cases irrespective of the presence of writing statuses (W) in an entry of the write control table 121. For the block judged as having a possibility of data recovery, data of the block is read to judge whether the data is actually recoverable, basing upon whether read errors occur or the number of identical update numbers. If data can be normally read and the number of identical update numbers is greater than the number of disk drives of the drive group 3 subtracted by the value of the degree of redundancy, then it is judged as recoverable.

In the case of the blocks 310a-4 to 310a-6 shown in FIG. 23, from the contents of the entries 1210a-4 to 1210a-6, they can be judged as having a possibility of data recovery because the number of write completed statuses (C) is "1" which is less than the degree of redundancy. The blocks 310a-4 to 310a-6 are therefore tried to read data. The block 310a-4 is judged as unrecoverable because the maximum number of identical update numbers is "2". The block 310a-5 is also judged as unrecoverable because the maximum number of identical update numbers is "3". However, the block 310a-6 is judged as recoverable because the maximum number of identical update numbers is "4". Such judgement may be executed when reading data from the host computer 2. Specifically, at the initial settings, for the recoverable block, its data is recovered, and for the unrecoverable block, an unaccessible status is stored in the non-volatile memory 12. In the data read, if the unaccessible status is being stored for a block to be read, a read error is informed to the host computer.

Figure 25:
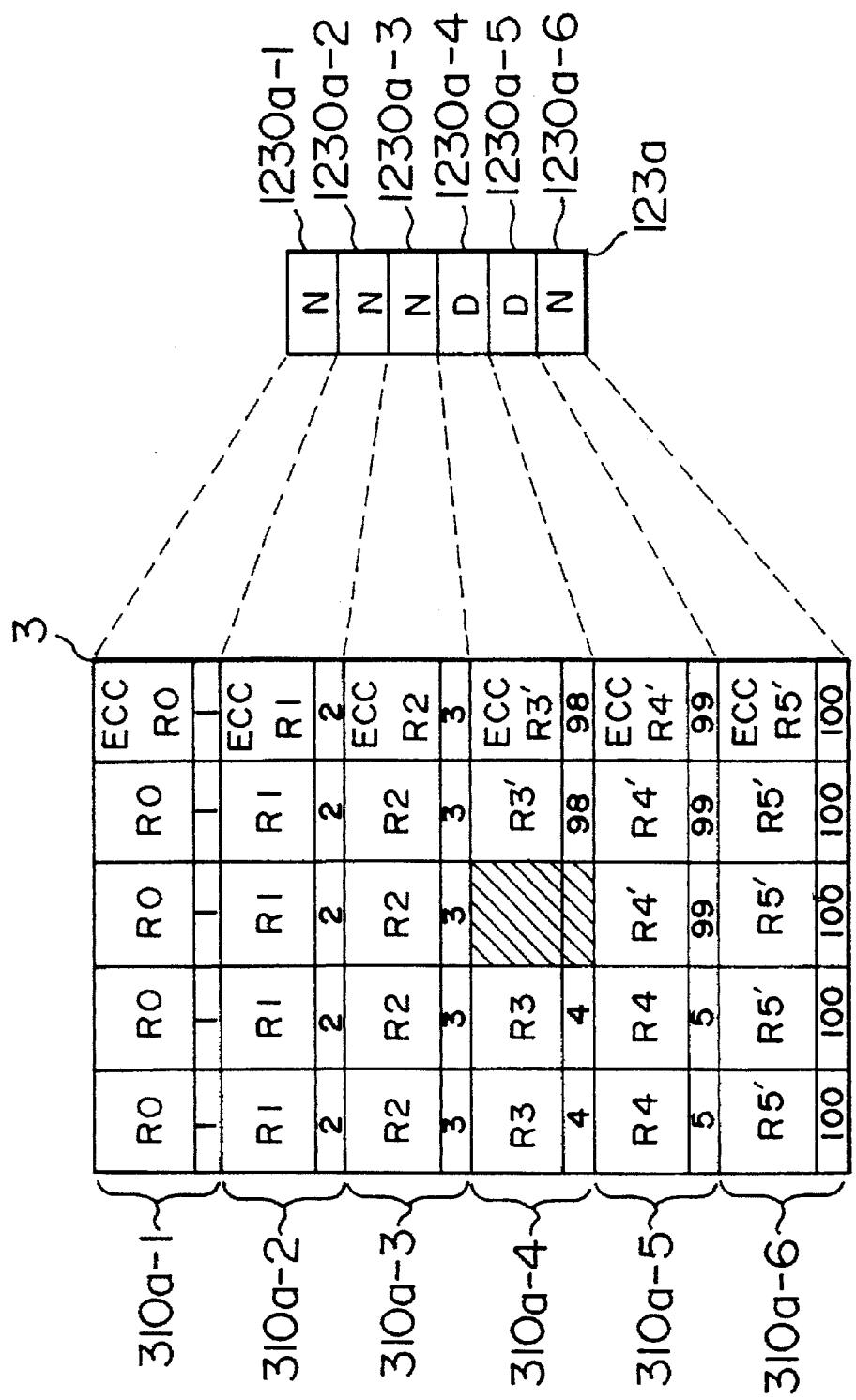
FIG. 25 shows the write statuses of disk drives after the data recovery, and settings of the defective write control table.

FIG. 25 shows the contents of the write control table for the drive group 3 after the data recovery, and the settings of a defective write control table 123a. The blocks 310a-1 to 310a-3 take the status after the data write, and the block 310a-6 takes the status before the data write. If the entries of the defective write control table 123a corresponding to these blocks are present, the normal write status (N) is set to the defective write flags 1230a-1 to 1230a-3, and 1230a-6. However, the blocks 310a-4 and 310a-5 are unrecoverable, so that the defective write status (D) is set to the defective write flags 1230a-4 and 1230a-5 of the defective write control table 123a. After the recovery of the recoverable defective write range and the settings of the defective write control table 123a, the write control table 121 which is now unnecessary is deleted from the non-volatile memory 12.

Figure 26:
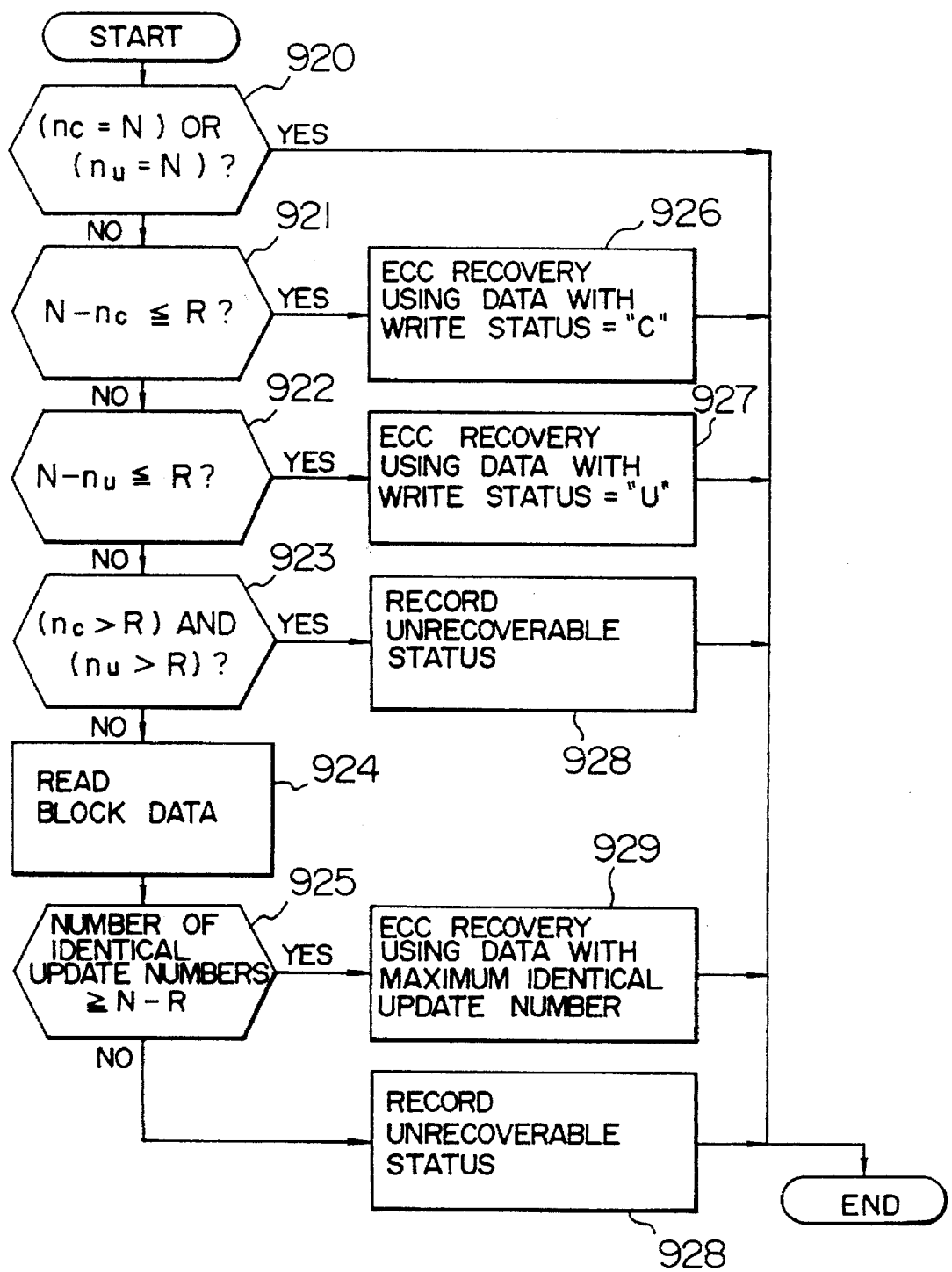
FIG. 26 is a flow chart showing the operation of discriminating a recoverable status of a defective write range according to the third embodiment.

FIG. 26 illustrates the recovery process for a defective block. In FIG. 26, N represents the number of disk drives constituting a drive group, nc represents the number of disk drives with the write completed status within a drive group, nu represents the number of disk drives with the no write indication status within a drive group, and R represents the degree of redundancy.

At step 920, it is checked whether the drive statuses of all disk drives of the drive group are the write completed status (C) or no write indication status (U). If all the drive statuses are the write completed status (C) or no write indication status (U), data recovery is unnecessary, and so the process terminates. If not, it is checked at step 921 whether or not the number (N - nc) of disk drives other than those with the write completed status (C) is equal to or less than the degree R of redundancy. If equal to or less than the redundancy degree R, data is recovered at step 926 by using the data of blocks with the write completed status (C). If it is judged at step 921 that the number (N - nc) of disk drives is greater than the degree R of redundancy, it is checked at step 922 whether or not the number (N - nu) of disk drives other than those with the no write indication status (U) is equal to or less than the degree R of redundancy. If equal to or less than the redundancy degree R, data is recovered at step 927 by using the data of blocks with the no write indication status (U). If it is judged at step 922 that the number (N - nu) of disk drives is greater than the degree R of redundancy, it is checked at step 923 whether the number (nu) of disk drives with the write completed status (C) is greater than the redundancy degree R and whether the number of disk drives with the no write indication status (U) is greater than the redundancy degree R. If the conditions at step 923 are satisfied, an unaccessible or unrecoverable status is recorded at step 928. If not satisfied, the data read of the block is executed at step 924. It is checked at step 925 whether or not the maximum number of identical update numbers of the read block is equal to or greater than the number N of disk drives of the drive group subtracted by the redundancy degree R. If the conditions at step 925 are satisfied, data is recovered at step 929 by using the data having the maximum number of identical update numbers. If not satisfied, an unrecoverable status is recorded at step 928.

In a disk array, a set of data is divisionally stored in a plurality of disk drives. Therefore, if a power cut or the like occurs during the data write to the disk array, data may sometimes be written only in some disk drives constituting the disk array even if there is slight variation of rotation or the like, resulting in a possibility of reading data which is meaningless from the logical point of view. According to the present invention, the data write statuses of disk drives are stored in a non-volatile memory. Therefore, the defective write range can be identified from the contents of the non-volatile memory, inhibiting the host computer to read meaningless data.

What is claimed is:

1. In a disk array controller connected to both a host computer for issuing an input/output request and a plurality of disk drives operating in parallel, said disk array controller responsive to an output request from said host computer for dividing data supplied from said host computer and writing in parallel said divided data in said plurality of disk drives, and responsive to an input request from said host Computer for collecting data read in parallel from said plurality of disk drives into a set of data and transferring said set of data to said host computer, the improvement comprising:

a non-volatile memory allocated with at least one write control area for storing a write status of each block within a data write area for each said disk drive to which data is to be written, said write status including a first status representing a write completed status of each said disk drive, a second status representing a writing status of each said disk drive, and a third status representing a no write indication status of each said disk drive;

a processor responsive to an output request from said host computer for storing in said non-volatile memory said write status; and when an output request data range contains a block to which said at least one write control area is not allocated, said processor stores the write status of said not-allocated block in said write control area having, as said write status of all blocks, said first status.

2. A disk array controller according to claim 1, wherein at least one of said disk drives for redundancy has redundant data for data recovery, and in one of a first case where said write control area indicates a presence of a block with said second status stored and a second case where said write control area corresponding to a plurality of blocks parallel read from said plurality of disk drives indicates a presence of both a block with said first status and a block with said third status, said processor recovers, from the data in blocks among said plurality of blocks parallel read from said plurality of disk drives and said redundant data, the data of the other blocks, and sends said recovered data to said host computer, if one of the number of blocks with said first status and the number of blocks with said third status is sufficient for the data recovery, and if not, said processor informs said host computer of a read error.

3. A disk array controller according to claim 1, wherein at the time of initial settings, in one of a first case where said write control area indicates a presence of a block with at second status stored and said second case where said write control area corresponding to a plurality of blocks parallel read from said plurality of disk drives indicates a presence of both a block with said first status and a block with said third status, said processor reads the data area in one of said first and second cases to store information representative of a read defective area in said non-volatile memory, releases said write control area corresponding to said read defective area, and informs said host computer of a read error in response to an input request from said host computer to said read defective area.

4. A disk array controller according to claim 1, wherein at least one of said disk drives for redundancy has redundant data for data recovery, and in one of a first case where said write control area indicates a presence of a block with said second status stored and a second case where said write control area corresponding to a plurality of blocks parallel read from said plurality of disk drives indicates a presence of both a block with said first status and a block with said third status, at the time of initial settings, said processor recovers, from the data in blocks among said plurality of blocks parallel read from said plurality of disk drives and said redundant data, the data of the other blocks, and writes said recovered data to a corresponding one of said disk drives, if one of the number of blocks with said first status and the number of blocks with said third status is sufficient for the data recovery, and if not, said processor reads the data area in one of said first and second cases to store information representative of a read defective area in said non-volatile memory, releases from said non-volatile memory said write control area where the write statuses of associated blocks are stored, and informs said host computer of a read error in response to an input request from said host computer to said read defective area.

5. In a disk array controller connected to both a host computer for issuing an input/output request and a plurality of disk drives operating in parallel, said disk array controller responsive to an output request from said host computer for dividing data supplied from said host computer and writing in parallel said divided data in said plurality of disk drives, and responsive to an input request from said host computer for collecting data read in parallel from said plurality of disk drives into a set of data and transferring said set of data to said host computer, the improvement comprising:

a non-volatile memory allocated with at least one write control area for storing a write status of each block within a data write area for each said disk drive to which data is to be written, said write status including a first status representing a write completed status of each said disk drive, a second status representing a writing status of each said disk drive, and a third status representing a no write indication status of each said disk drive;

a processor responsive to an output request from said host computer for storing in said non-volatile memory said write status; and said processor informs said host computer of a read error in response to an input request from said host computer, in one of a first case where said at least one write control area indicates a presence of a block with said second status stored, and a second case where said write control area corresponding to a plurality of blocks parallel read from said plurality of disk drives indicates a presence of both a block with said first status and a block with said third status.

6. A disk array controller according to claim 5, wherein after the data write to data area in one of said first and second cases is normally completed, said processor deletes said write status for said data area from said write control area.

7. A disk array controller according to claim 5, wherein at least one of said disk drives for redundancy has redundant data for data recovery, and in one of said first case where said write control area indicates a presence of a block with said second status stored and said second case where said write control area corresponding to a plurality of blocks parallel read from said plurality of disk drives indicates a presence of both a block with said first status and a block with said third status, said processor recovers, from the data in blocks among said plurality of blocks parallel read from said plurality of disk drives and said redundant data, the data of the other blocks, and sends said recovered data to said host computer, if one of the number of blocks with said first status and the number of blocks with said third status is sufficient for the data recovery, and if not, said processor informs said host computer of a read error.

8. A disk array controller according to claim 5, wherein at the time of initial settings, in one of said first case where said write control area indicates a presence of a block with said second status stored and said second case where said write control area corresponding to a plurality of blocks parallel read from said plurality of disk drives indicates a presence of both a block with said first status and a block with said third status, said processor reads the data area in one of said first and second cases to store information representative of a read defective area in said non-volatile memory, releases said write control area corresponding to said read defective area, and informs said host computer of a read error in response to an input request from said host computer to said read defective area.

9. A disk array controller according to claim 5, wherein at least one of said disk drives for redundancy has redundant data for data recovery, and in one of said first case where said write control area indicates a presence of a block with said second status stored and said second case where said write control area corresponding to a plurality of blocks parallel read from said plurality of disk drives indicates a presence of both a block with said first status and a block with said third status, at the time of initial settings, said processor recovers, from the data in blocks among said plurality of blocks parallel read from said plurality of disk drives and said redundant data, the data of the other blocks, and writes said recovered data to a corresponding one of said disk drives, if one of the number of blocks with said first status and the number of blocks with said third status is sufficient for the data recovery, and if not, said processor reads the data area in one of said first and second cases to store information representative of a read defective area in said non-volatile memory, releases from said non-volatile memory said write control area where the write statuses of associated blocks are stored, and informs said host computer of a read error in response to an input request from said host computer to said read defective area.

10. In a disk array controller connected to both a host computer for issuing an input/output request and a plurality of disk drives operating in parallel, said disk array controller responsive to an output request from said host computer for dividing a set of data supplied from said host computer into a plurality of divided data and writing in parallel said divided data into said plurality of disk drives, and responsive to an input request from said host computer which requests said set of data, for assembling said divided data read in parallel from said plurality of disk drives into said set of data and transferring said set of data to said host computer, the improvement comprising:

a non-volatile memory; and a processor responsive to said output request from said host computer for storing in said non-volatile memory a write status information indicating whether said writing in parallel of said divided data has been completed, and responsive to said input request from said host computer for checking in accordance with said write status information, whether said set of data comprising said divided data written in said disk drives is distorted and for informing said host computer of a read error if said set of data is distorted as a result of said checking.

11. A disk array controller according to claim 10, wherein at least one of said disk drives includes redundant data for data recovery, and in response to said input request from said host computer, said processor recovers data by using said redundant data if said set of data having distortion can be corrected by using said redundant data and transfers said recovered data to said host computer.

* * * * *